US012623930B2

(12) United States Patent
Katz

(10) Patent No.: US 12,623,930 B2
(45) Date of Patent: May 12, 2026

(54) APPARATUS, METHOD AND SYSTEM FOR DESALINATING WATER USING ENERGY RECOVERY

(71) Applicant: Katz Water Tech, LLC, Houston, TX (US)

(72) Inventor: Gary P. Katz, Houston, TX (US)

(73) Assignee: Katz Water Tech, LLC, Houston, TX (US)

( * ) Notice: Subject to any disclaimer, the term of this patent is extended or adjusted under 35 U.S.C. 154(b) by 568 days.

(21) Appl. No.: 17/741,364

(22) Filed: May 10, 2022

(65) Prior Publication Data

US 2022/0267176 A1 Aug. 25, 2022

Related U.S. Application Data

(63) Continuation of application No. 16/688,918, filed on Nov. 19, 2019, now Pat. No. 11,325,849, which is a
(Continued)

(51) Int. Cl.
*C02F 1/44* (2023.01)
*B01D 61/02* (2006.01)
(Continued)

(52) U.S. Cl.
CPC ............ *C02F 1/441* (2013.01); *B01D 61/026* (2022.08); *B01D 61/06* (2013.01); *B01D 63/06* (2013.01); *C02F 1/004* (2013.01); *C02F 1/444* (2013.01); *E21B 15/02* (2013.01); *E21B 43/20* (2013.01); *B01D 2311/04* (2013.01); *B01D 2311/2649* (2013.01); *B01D 2313/246* (2013.01);
(Continued)

(58) Field of Classification Search
CPC .... B01D 61/02; B01D 61/022; B01D 61/025; B01D 61/04; B01D 61/06; B01D 61/08; B01D 61/58; B01D 2317/04; B01D 2317/06; B01D 63/12; B01D 2313/246; B01D 33/35; C02F 1/441; C02F 2103/08; C02F 2303/24; C02F 2303/10; C02F 2201/001; C02F 2201/008; Y02A 20/124; Y02A 20/131
See application file for complete search history.

(56) References Cited

U.S. PATENT DOCUMENTS 4,051,810 A 10/1977 Breit
4,189,379 A 2/1980 Finley
(Continued)

FOREIGN PATENT DOCUMENTS

EP 0328178 1/1989
EP 959048 2/2000
WO 2015088259 6/2016

*Primary Examiner* — Pranav N Patel
(74) *Attorney, Agent, or Firm* — Gary P. Katz; Katz Law Group LLC

(57) ABSTRACT

An apparatus, system and method to purify water is disclosed. Pumps and energy recovery devices for taking water from an intake, filtering the water to remove solid contaminates before running the filtered water through the reverse osmosis system to the discharge device and purified water lines are described. The system may comprise a control panel that controls the plurality of filters, plurality of reverse osmosis membranes, purified water line and effluent discharge device, to achieve favorable water purification. A method that utilizes the apparatus and/or system is described herein.

20 Claims, 11 Drawing Sheets

Related U.S. Application Data continuation of application No. 15/614,603, filed on Jun. 5, 2017, now Pat. No. 10,479,706.

(60) Provisional application No. 62/345,077, filed on Jun. 3, 2016.

(51) Int. Cl.

| | |
|---|---|
| *B01D 61/06* | (2006.01) |
| *B01D 63/06* | (2006.01) |
| *C02F 1/00* | (2023.01) |
| *E21B 15/02* | (2006.01) |
| *E21B 43/20* | (2006.01) |
| *C02F 103/08* | (2006.01) |

(52) U.S. Cl.

CPC ...... *B01D 2317/04* (2013.01); *C02F 2103/08* (2013.01); *C02F 2201/008* (2013.01); *C02F 2303/10* (2013.01); *Y02A 20/131* (2018.01); *Y02A 20/152* (2018.01); *Y02W 10/30* (2015.05)

(56) References Cited

U.S. PATENT DOCUMENTS

| | | | |
|---|---|---|---|
| 4,245,475 | A | 1/1981 | Girden |
| 4,311,012 | A | 1/1982 | Finley |
| 4,703,626 | A | 11/1987 | Jensen |
| 6,313,545 | B1 | 11/2001 | Alstot et al. |
| 6,325,586 | B1 | 12/2001 | Loy |
| 6,348,148 | B1 | 2/2002 | Bosley |
| 6,510,687 | B1 | 1/2003 | Zaslavsky et al. |
| 6,559,554 | B2 | 5/2003 | Alstot et al. |
| 6,575,247 | B2 | 6/2003 | Tolman et al. |
| 7,081,205 | B2 | 7/2006 | Gordon et al. |
| 7,132,759 | B2 | 11/2006 | Alstot et al. |
| 7,239,037 | B2 | 7/2007 | Alstot et al. |
| 7,306,724 | B2 | 12/2007 | Gordon |
| 7,329,962 | B2 | 2/2008 | Alstot et al. |
| 7,416,666 | B2 | 8/2008 | Gordon |
| 7,455,778 | B2 | 11/2008 | Gordon |
| 7,476,323 | B2 | 1/2009 | Gordon |
| 7,485,234 | B2 | 2/2009 | Max |
| 7,510,658 | B2 | 3/2009 | Gordon |
| 7,547,392 | B2 | 6/2009 | Gordon |
| 7,658,843 | B2 | 2/2010 | Krock et al. |
| 7,898,102 | B2 | 3/2011 | Alstot et al. |
| 7,969,029 | B2 | 6/2011 | Vitagliano |
| 8,457,780 | B2 | 6/2013 | Kharkover |
| 9,157,332 | B2 | 10/2015 | Hanna |
| 9,328,624 | B2 | 5/2016 | Finley |
| 2003/0173784 | A1 | 9/2003 | Jones et al. |
| 2007/0056907 | A1 | 3/2007 | Gordon |
| 2008/0011681 | A1 | 1/2008 | Gordon |
| 2010/0270217 | A1 | 10/2010 | Burrows |
| 2010/0270227 | A1 | 10/2010 | Kang |
| 2014/0048462 | A1 | 2/2014 | Cohen |
| 2015/0191380 | A1 | 7/2015 | Glass |
| 2016/0375408 | A1 | 12/2016 | Moon |

APPARATUS, METHOD AND SYSTEM FOR DESALINATING WATER USING ENERGY RECOVERY

CROSS REFERENCE TO RELATED APPLICATION

This non-provisional patent application claims priority to co-pending United States non-provisional patent application having the Ser. No. 16/688,918, filed on Nov. 19, 2019 and issued as U.S. Pat. No. 11,325,849 on May 10, 2022 which claimed priority to co-pending U.S. non-provisional patent application having the Ser. No. 15/614,603, filed on Jun. 5, 2017 and issued as U.S. Pat. No. 10,479,706 on Nov. 19, 2019 which claimed priority to U.S. patent provisional application having the Ser. No. 62/345,077, filed Jun. 3, 2016 which is incorporated by reference in its entirety.

TECHNICAL FIELD

This invention relates to the field of reducing the contaminate concentration of water or desalination. In one embodiment, this invention relates generally to the field of industrial and municipal water supply. In a specific embodiment, this invention generally relates to using an offshore structure to desalinate water and transporting the desalinated water to land for use in industrial, agricultural and municipal water supplies.

BACKGROUND

This section introduces the reader to various aspects of art, which may be associated with embodiments of the present invention. This discussion is helpful in providing the reader with information to facilitate a better understanding of particular techniques of the present invention. Accordingly, it should be understood that these statements are to be read in this light, and not necessarily as admissions of prior art.

The world is running out of potable fresh water. Worldwide, an estimated 700 million people cannot obtain enough clean water. In the next 10 years, the number is projected to increase to approximately 1.8 billion people. In some regions, obtaining fresh water from seawater may be the only viable way to increase supply of fresh water.

Parts of the West coast of the United States, especially California, has been in a severe long-term drought. This long-term drought has stressed the water resources of the region. The environmental damage includes damage to the ecology and hydrology from diminishing groundwater and acquirer water resources that are being excessively depleted to provide the water requirements of individuals, agriculture and industry. Furthermore, the lack of sufficient water supply is hurting the economy by forcing the region to charge more for water resources and shutting down some water intensive industries and businesses.

In the past, desalination plants have been proposed to resolve the fresh water resources problem. Reverse osmosis ("RO") plants have been delivering desalinated water for decades to regions with limited water resources. However, the high cost to build and operate the RO plants historically made the plants uneconomical for most regions. Accordingly, the major issue of RO technology is that it costs too much. The RO process requires significant energy to force salt water against polymer membranes that have pores small enough to let fresh water through while holding salt ions back.

New plants, using innovative technology, such as, the Sorek plant in Israel have significantly reduced the cost per cubic volume versus conventional desalination plants. The Sorek plant, with a capacity of over 150 million gallons per day of desalinated water, has significantly reduced energy consumption through technological advances and economics of scale using scalable designs. For example, the Sorek plant incorporates a number of engineering improvements to increase efficiencies over previous RO facilities. This technology includes utilizing larger pressure tubes that are 16 inches in diameter rather than eight inches. The larger pressure tubes require only a fourth as much piping and other hardware, slashing costs. The facility uses highly efficient pumps and energy recovery devices. In addition, new technologies are being developed such as, advanced membranes made of atom-thick sheets of carbon, which hold the promise of further cutting the energy requirements of desalination plants.

While this technology has improved the economics of RO desalination, there are still many additional problems to be solved. One problem is the lack of available waterfront land in many regions from over development along the coastlines and developmental restrictions including Not-In-My-Back-yard or "NIMBYism." Offshore desalination has been proposed and desalination has been done on ships. There have been proposals to construct large-scale desalination plants on barges or offshore structures.

However, the barges, ships and offshore structures being proposed are difficult to install and are not designed to effectively handle large scale desalination. Accordingly, there is a need for an offshores structure apparatus, system and method that facilitates efficient setup of large scale desalination units that can efficiently purify large volumes of water. Embodiments of the invention disclosed herein satisfies these needs.

The disposal of the highly-concentrated salt brine that contains other chemicals used throughout the process has become a major environmental issue. Large coastal seawater desalination plants discharge brine into oceans and estuaries and therefore, technologies must be developed to provide safe disposal and/or discharge of brine effluent. Typically, twice as saline as the ocean, the brine discharge is denser than the waters into which it is discharged into and thus, usually sinks and slowly spreads along the ocean floor, where there is typically minimal wave energy or currents to mix discharge. There are several proven methods to disperse concentrated brine, such as multi-port diffusers placed on the discharge pipe to promote mixing or injecting the discharge brine below the seafloor. Discharge brine can also be diluted with effluent from a wastewater treatment plant or with cooling water from a power plant or other industrial user. Unfortunately, these approaches have not been shown to sufficiently reduce the brine concentration enough to prevent serious harm to marine life surrounding the discharge point source.

Accordingly, there is a need to provide offshore desalination, with the ability to efficiently reduce the salinity of the effluent brine discharge to avoid environmental issues to marine ecosystems, including killing marine organisms. In addition, there is a need to further reduce the operating costs by reducing the amount of power needed and reducing the number of necessary personnel. In addition to desalination, there is a need to dilute offshore wastewater for maritime, offshore, and nearshore industrial activities. The multiple apparatus, method and system embodiments, disclosed herein, can solve these needs.

In one embodiment, an apparatus is disclosed. In this embodiment, the apparatus comprises: a structure (such as, an offshore structure), wherein the offshore structure comprises a water intake device connected to a plurality of filters connected to a plurality of reverse osmosis filters in communication with a purified water line and effluent discharge device. A plurality of filters moves the water from the intake and then through the reverse osmosis membranes to the discharge device and purified water lines.

In another embodiment, a method is disclosed. In this embodiment, the method comprises obtaining a structure comprising a water purification system; flowing water into an inlet device; pumping the water through a filtration system; flowing the filtered water through a plurality of reverse osmosis filters; flowing purified water through a purified water line; and flowing discharge effluent through a discharge device that mixes the discharge with seawater before point discharge.

In another embodiment, a system is disclosed. This system comprises a structure. The structure comprises a water intake device connected to a plurality of filters that are connected to a plurality of reverse osmosis membranes in communication with a purified water line and effluent discharge device; and a control panel that controls, the pumps, filters, reverse osmosis membranes and discharge devices. In a more specific embodiment, the system controls the discharge device to achieve favorable mixing of the discharged water and the water from the inlet, electrical generation, or combinations thereof.

SUMMARY

In one embodiment, an apparatus is disclosed. In this embodiment, the apparatus comprises: a structure (such as, an offshore structure), wherein the offshore structure comprises a water intake device connected to a plurality of filters connected to a plurality of reverse osmosis filters in communication with a purified water line and effluent discharge device. A plurality of filters moves the water from the intake through the filters through the reverse osmosis membranes to the discharge device and purified water lines.

In another embodiment, a method is disclosed. In this embodiment, the method comprises obtaining a structure comprising a water purification system; flowing water into an inlet device; pumping the water through a filtration system; flowing the filtered water through a plurality of reverse osmosis filters; flowing purified water through a purified water line; and flowing discharge effluent through a discharge device that mixes the discharge with seawater before point discharge.

In another embodiment, a system is disclosed. This system comprises a structure. The structure comprises a water intake device connected to a plurality of filters that are connected to a plurality of reverse osmosis membranes in communication with a purified water line and effluent discharge device; and a control panel that controls, the pumps, filters, reverse osmosis membranes and discharge devices. In a more specific embodiment, the system controls the discharge device to achieve favorable mixing of the discharged water and the water from the inlet, electrical generation, or combinations thereof.

While certain exemplary embodiments have been described in detail and shown in the accompanying drawings, it is to be understood that such embodiments are merely illustrative of and not devised without departing from the basic scope thereof, which is determined by the claims that follow.

BRIEF DESCRIPTION OF THE DRAWINGS

The accompanying drawings, which are incorporated in and constitute a part of this specification, illustrate an implementation of methodology and systems consistent with the present disclosure and, together with the detailed description, serve to explain advantages and principles consistent with the disclosure. In the drawings.

DESCRIPTION OF EMBODIMENTS

Figure 1:
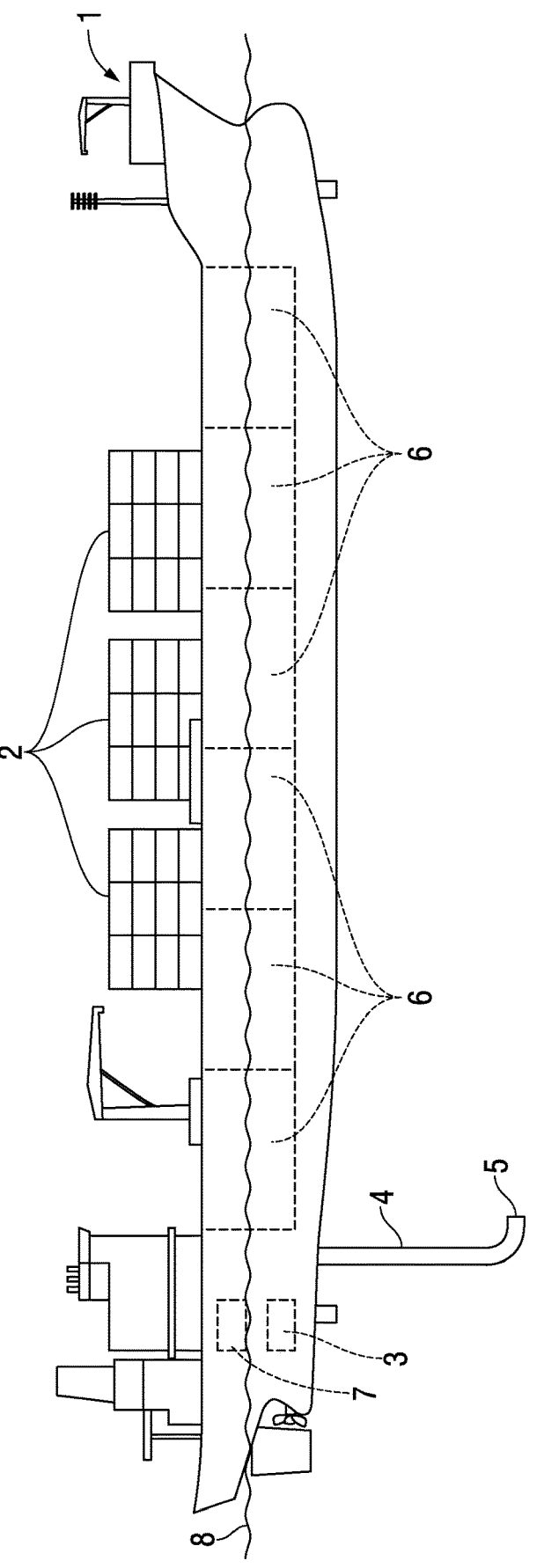
FIG. 1 illustrates a side view of an offshore ship containing a water purification apparatus and system.

Below is a description of various embodiments of the invention. Before describing selected embodiments of the present disclosure in detail, it is to be understood that the present invention is not limited to the particular embodiments described herein. The disclosure and description herein are illustrative and explanatory of one or more presently preferred embodiments and variations thereof. It will be appreciated by those skilled in the art that various changes in the design, organization, means of operation, structures and location, methodology, and use of mechanical equivalents may be made without departing from the spirit of the invention.

It should be understood that the drawings are intended to illustrate and plainly disclose presently preferred embodiments to one of skill in the art but are not intended to be manufacturing level drawings or renditions of final products. These may include simplified conceptual views to facilitate understanding or explanation. In addition, the relative size and arrangement of the components may differ from that shown and still operate within the spirit of the invention.

Moreover, it should be understood that various directions such as "upper", "lower", "bottom", "top", "left", "right", "first", "second" and so forth are made only with respect to explanation in conjunction with the drawings. The inventive components may be oriented differently, for instance, during transportation, manufacturing and operations. Numerous varying and different embodiments and modifications may be made within the scope of the concept(s) embodiments herein taught and described. Therefore, it is to be understood that the details herein are to be interpreted as illustrative and non-limiting. For example, many embodiments and examples are used to describe reducing the salinity of brine discharge from a desalinization plant. However, the invention can be used to handle any offshore effluent discharge including discharges from maritime and industrial activities.

One embodiment of the invention uses at least one offshore device to support a water purification apparatus and system offshore. Embodiments of this invention can be adapted for any offshore holding device including ships, barges, natural and man-made islands or coastlines, rigs, submersibles, semi-submersibles and all offshore structures such as, fixed platforms, compliant towers, semi-submersible platform, jack-up drilling rigs, drill ships, floating production systems, tension-leg platforms, gravity-based structures, spar platforms, normally unmanned installations (NUI), conductor support systems, and barges. In a preferred embodiment, a specially designed spar structure utilizing these embodiments can operate alone or with the assistance of additional ships and/or attached or nearby equipment.

Semi-submersible Platform

Semi-submersible platforms have hulls (such as, columns and pontoons) of sufficient buoyancy to cause the structure to float, but of weight sufficient to keep the structure upright. A Semi-submersible platform can be moved from place to place and can be ballasted up or down by altering the amount of flooding in buoyancy tanks. Modern examples of semi-submersible platforms are disclosed in U.S. Pat. Nos. 7,565, 877, 8,813,670 and 9,003,995. U.S. Pat. Nos. 7,565,877, 8,813,670 and 9,003,995 are hereby incorporated by reference. Modern day semi-submersible barges enable quick efficient construction, streamlined installation through a tug boat or support ship and provides sufficient space to house the desalination system. Persons skilled in the art with the benefit of the disclosure herein will recognize many similar devices that can be used, and all are intended to be within the scope of this invention.

SPARS

SPARS provide advantages to semi-submersible platforms including the ability to operate in deep water, large storage space under the water, and quick modular construction and deployment. The deep draft design of spars makes them less affected by wind, wave and currents. Modern examples of semi-submersible platforms are disclosed in U.S. Pat. Nos. 7,413,384 and 9,022,693. U.S. Pat. Nos. 8,813,670 and 9,003,995 are hereby incorporated by reference. Persons skilled in the art with the benefit of the disclosure herein will recognize many similar devices that can be used, and all are intended to be within the scope of this invention.

Desalination System

The desalination system comprises several components. These components include an inlet system wherein coastal water (typically ocean salt-water or brackish water) is moved using a pump system for flowing the water from the inlets to the filters reverse osmosis membranes and then the water components are then flowed either to the effluent discharge or purified water lines. Each of components will be discussed in detail below.

FIG. 1 illustrates a modified view of a prior art offshore ship containing a water purification apparatus and system 1. FIG. 1 is from U.S. Pat. No. 7,416,666, which is hereby incorporated by reference. As shown in FIG. 1, the vessel 1 may comprise a plurality of reverse osmosis systems 2, also referred to as trains that can be installed on the deck and other parts of the ship. The reverse osmosis system is part of a water purification system. The water purification system includes comprising a power system 3, a water intake system 4 comprising a water intake 5 and a water intake pump; a reverse osmosis system comprising a high pressure pump and reverse osmosis membranes, a concentrate discharge system comprising a plurality of concentrate discharge ports; a packing system 7 for a permeate transfer system comprising a transfer pump; a power source; and a control system. The interior compartments 6 can hold mixing tanks, cargo holds and other equipment.

Figure 2:
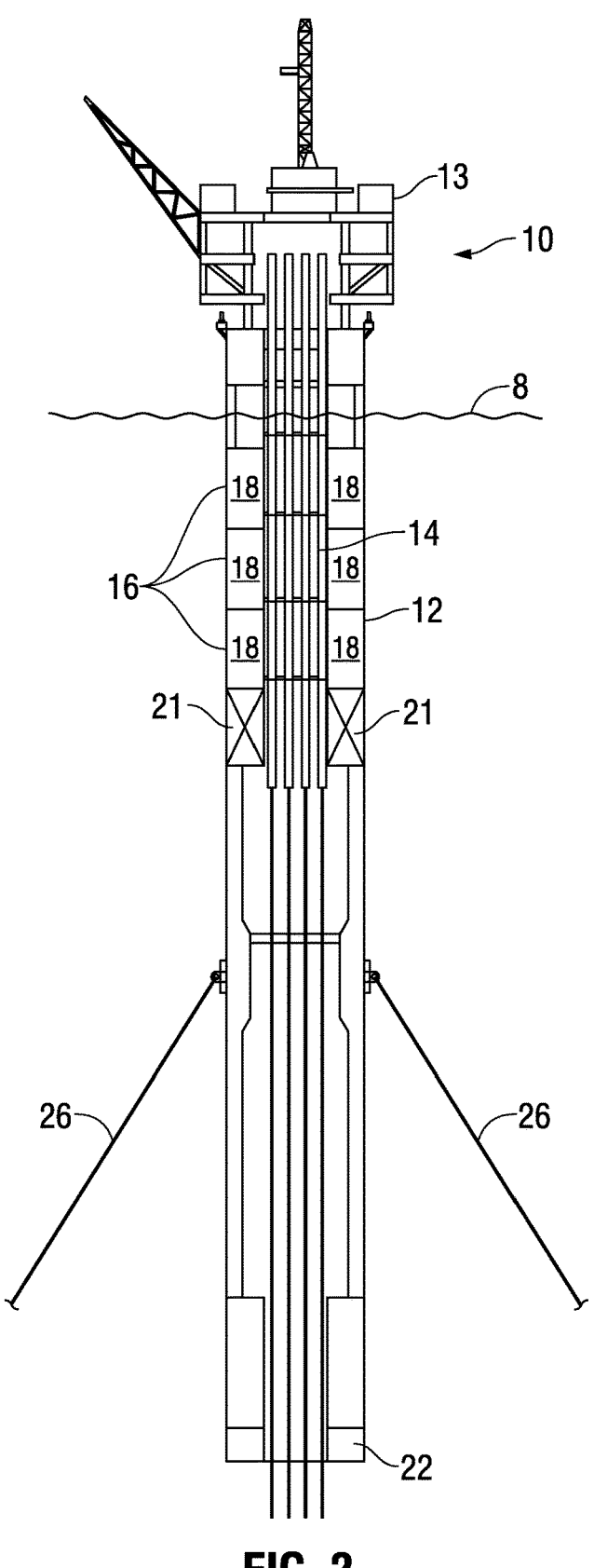
FIG. 2 illustrates a side cross-sectional view of a SPARS offshore structure.

FIG. 2 is an example of a semisubmersible SPAR platform 10 from U.S. Pat. No. 7,565,877 which was incorporated by reference. As shown in FIG. 2, the components include: a hollow center-well 14 that is open to the sea at its lower end, and open to the atmosphere at its upper end. The hull 12 supports a deck 13 on which water desalination equipment (not shown) may be mounted, along with other structures. The hull 12 includes a plurality of buoyancy tanks 16 surrounding the center-well 14. The buoyancy tanks 16 define voids or compartments 18 that may be selectively filled with air or water to provide varying degrees of buoyancy to the platform 10. The buoyancy tanks 16 extend down to a truss substructure 21, which, in turn, extends down to a ballasted keel 22. The ballasted keel 22 at the bottom of the truss structure 21 lowers the center of gravity of the platform 21 and improves the stability of the platform 10. One or more mooring lines 26 may be used to keep the platform 10 over its station.

Spar platforms are typically used in conjunction with one or more risers that extend under tension from the platform to a wellhead or an anchor on the seafloor. For example, the platform 10 of FIG. 1 includes top-tensioned risers (TTRs) 26. The TTRs 26 extend downward through the center-well 14. The hull 12 supports the support the platform 10 above the surface 8 of a body of water (for example, ocean).

In one embodiment, as discussed later, the substructure of the truss could be used to house equipment and/or store purified water. In addition, the large vertical drop in the truss could be used to create head and recapture of the energy during desalination. For example, media, dual-media, and multi-media gravity filters could be used below the sea water level to allow gravity to filter the water making it much more efficient than centrifuge and membrane filters including micro- and ultra-filtration systems, as described below.

Figure 3:
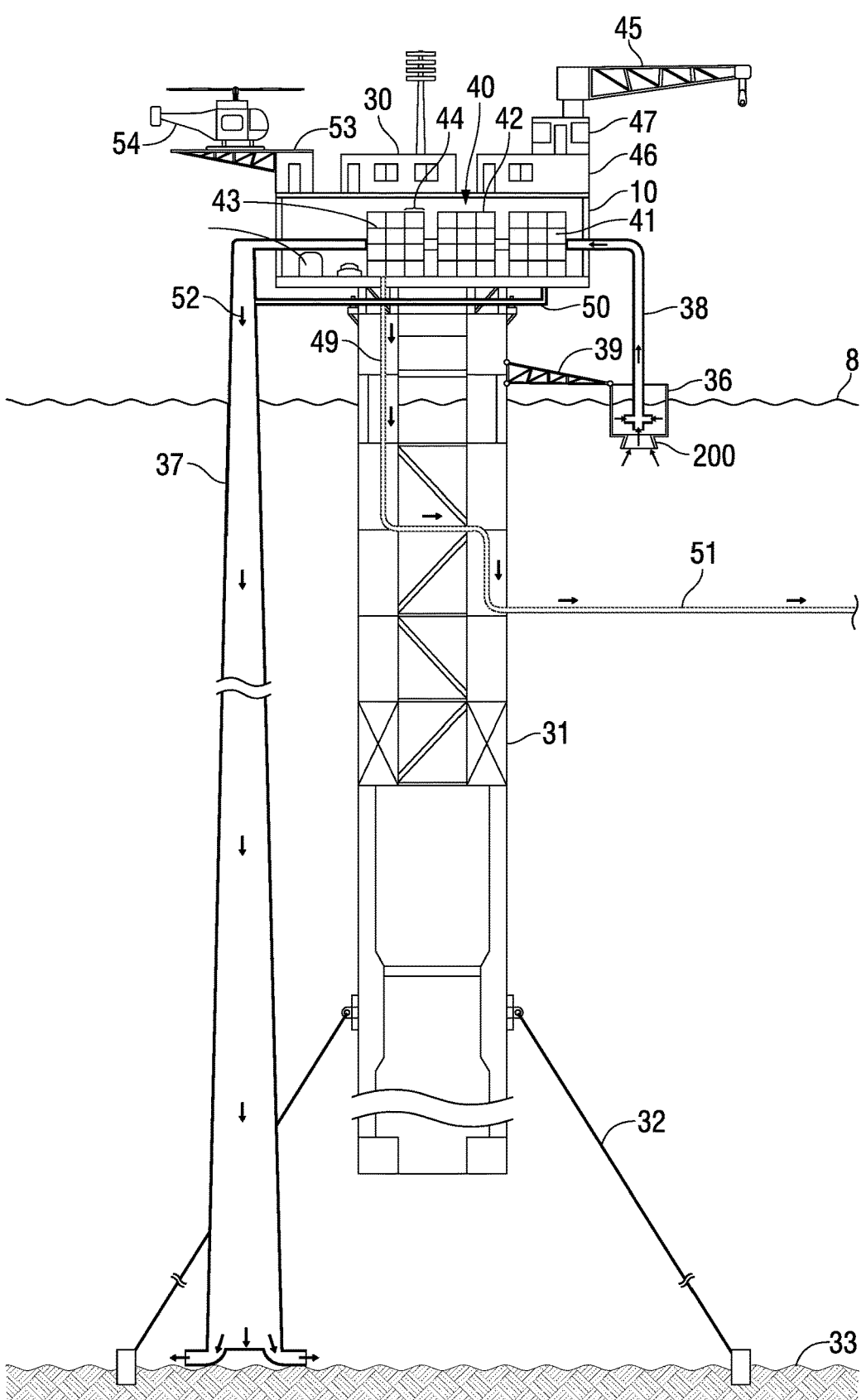
FIG. 3 illustrates a side cross-sectional side view of an embodiment of this invention wherein an offshore desalination plant is connected to an inlet device and a discharge device.

FIG. 3 shows the semis-submersible structure 10 has a platform 30 and a truss substructure 31 with tension or mooring lines 32 that are deployed to connect the bottom base truss substructure 31 to the ocean floor 33 to provide support. The water purification apparatus and system can be located throughout the semi-submersible structure 10 including inside, above or below the horizontal platform 30 section above the water 8. Alternatively, equipment could be located below the waterline including in the truss substructure 31. The embodiment shown in FIG. 3 is for deeper water applications. In shallow water, a barge, ship, or other structure would be connected directly to the ocean floor instead of tension or mooring lines 32 connecting to the ocean floor 33. This application can use tension cables that are operated with hydraulic cylinders controlled by a control system to favorably maintain and position the structure 30 comprising the water purification apparatus and system. These systems are well known by persons skilled in the art and can be adopted for this system utilizing the disclosures herein. The buoyancy structure such as, the truss substructure 31 may also provide counter weight and buoyancy for the inlet systems 36 and outlet or discharge systems 37 as well as the water purification apparatus on the platform 30.

Figure 4:
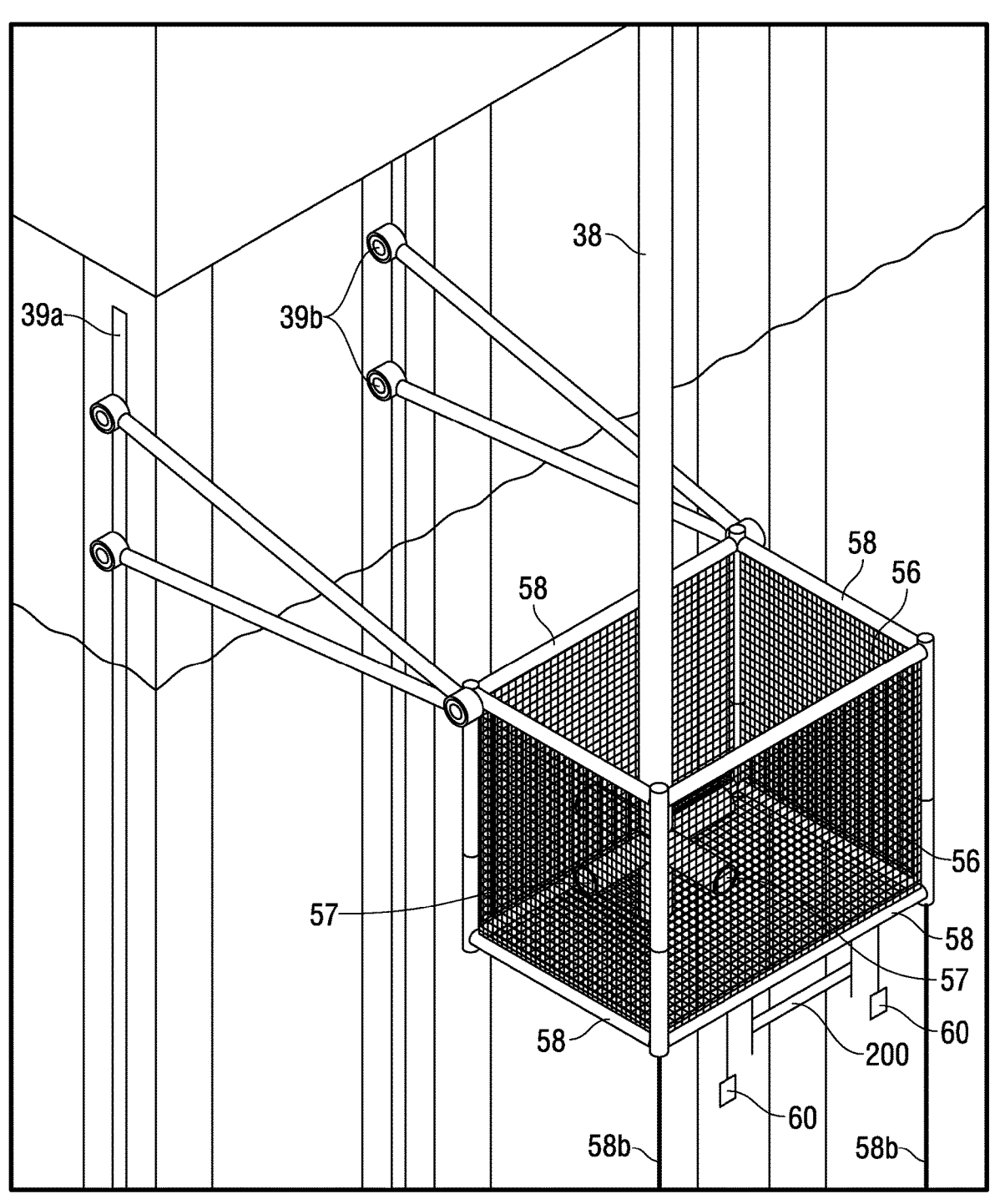
FIG. 4 illustrates a schematic of an inlet device.

The inlet system 36 is designed to efficiently handle large volumes of water flowing through the water purification apparatus and system. As shown in FIG. 4, the inlet system 36 comprises a plurality of permeable walls, preferably at least one buoyancy device 200, and at least one pipe or tubular 38 connecting the inlet device 36 to the water purification apparatus and system.

The plurality of walls is designed to permit water flow while preventing larger objects and aquatic life from entering the inlet device 36. For example, the walls can be made of netting, metal screens or fence-like links to keep large particles and aquatic life out. Typically, the pumps are located on the platform structure 30 or on other devices such as, supports ships (not shown). Preferably, the pipes connecting the inlet device 36 to the structure should be flexibles pipe such as, coiled tubing pipe to allow for movement during operations. Alternatively, the truss substructure 31 can house the pumps and other equipment for the inlet system. For example, a sliding crane or hoist 39 can be used to lower and raise the inlet device to obtain favorable depth and thus favorable inlet water properties. In addition, the inlet system 36 can have a plurality of mooring lines (not shown) similar to the mooring line 32 on the truss 31. A plurality of mooring lines can connect both the inlet system 36 and the outlet system 37 to the truss substructure 31, the platform 30 or to the ocean floor 33. In one embodiment weights which can be permanently attached or removably attached. These weights or similar devices can keep the outer walls taut even if they are flexible or in high energy environments.

Now referring to FIG. 3, the platform truss sub-structure 31, typically includes an interior housing unit 40 comprising a water purification system. The water purification system shown in FIG. 3 comprises two pre-filtration systems and a reverse osmosis system. The pretreatment systems from large industrial plants such as, the Sorek plant, can be redesigned to fit in the confined space of a semi-submersible platform or SPAR. In one embodiment, the housing can house the traditional filtering systems and RO systems of desalination plants which include a plurality of coarse filters 41, a plurality of fine filters or membrane filters 42 and a plurality of reverse osmosis membrane filters 43. A plurality of filters can include separate devices, at least two filter sections inside one device or housing, or combinations thereof. An automated lift system such as, a crane system 44 allows for efficient installation and/or replacement of the components including, but not limited to, the plurality of coarse filters 41, the plurality of fine filters 42, the plurality of reverse osmosis filters 43, and the plurality of post-treatment devices 55.

An exterior crane 45 can be used to lift equipment including containers for supply ships. Preferably the exterior crane can be coordinated with the interior overhead crane 40 to allow efficient insertion and removal of equipment through an exterior transfer point 46. This would facilitate the direct transfer of equipment from a ship into the interior housing of the platform and facilitate removal of equipment. The transfer point 46 can use cranes, robotic arms, conveyer belts and other known devices to move the equipment. In addition, internal automated lifts 41 or robotic arms can bring and/or insert equipment to the proper slots or housing, as needed. An automated system would allow the transfer of equipment from the ship to the exterior crane 45 to the interior overhead crane 44 to the interior lift 47 for direct insertion into the equipment slot without any human intervention. Likewise, removal of the equipment can be accomplished through a lift 47 removing the equipment to the overhead crane 44 and the overhead crane 44 moving the equipment to the exterior crane 45 for storage on the top of the platform 30 or direct removal to a supply ship. Automated connections, disconnects and the control system described below can make operation possible with minimal crews, as described below.

After the water is flowed through the plurality of coarse filters 41, the plurality of fine filters 42 and the plurality of reverse osmosis membranes 43, the water comprises at least two components. The water components include a purified water flow and at least one effluent discharge water flow and possibly additional water flows (such as, recycling lines) based on design and efficiency objectives and operational conditions, as discussed below. The purified water flow is flowed through at least one purified pipe or tubulars 49 to storage tanks (not shown) in the structure 30 or truss substructure 31 for storage and then later transported such as, via ship or pipeline 51 to the coast. The effluent discharge water is flowed through at least one effluent pipe or tubulars (shown as arrow 52) to a discharge device 37 in the ocean.

In one embodiment, an external wastewater pipe or plurality of pipes or tubulars 50 can be connected or attached to the offshore platform 30 or other parts of the structure. These wastewater pipes or tubulars 50 allows wastewater from the plurality of first filters 41, the plurality of second filters 42, the plurality of reverse osmosis filters 43, or combinations thereof, to be efficiently removed and/or recycled, as needed. The wastewater in the wastewater stream pipe or tubulars 50 can be connected to the at least one effluent pipe or tubulars 52 to a discharge device 37 in the ocean.

Possible additional equipment includes a landing pad 53 for a helicopter 54 and inside the enclosed housing 40 post finishing equipment to add minerals as necessary to the desalinated water. To conserve space, post-conditioning of the water could be done on the land, based on required specifications for industrial, agricultural and municipal uses.

The location of the units shown in FIG. 3 are for illustrative and descriptive purposes only and are not meant to be limiting as persons skilled in art can vary the placement of the equipment with the benefit of the disclosure herein. The components in FIG. 3 will be discussed in greater detail below.

Inlet Device

FIG. 4 illustrates a more detailed view of the water inlet device 36 previously shown and discussed in FIG. 3 wherein similar elements are given the same reference numerals. The water inlet device comprises a plurality of walls 56, which in the embodiment shown in FIG. 1, forms a rectangle.

Figures 5, 6:
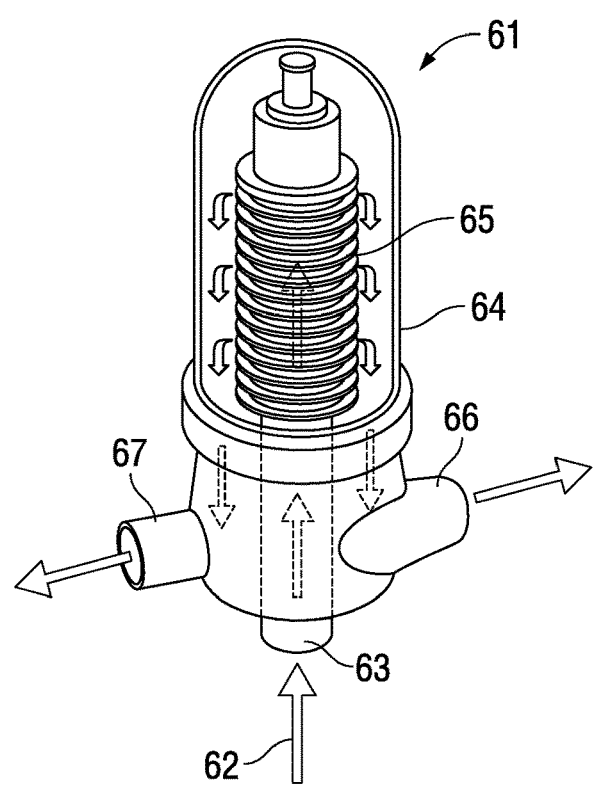
FIG. 5 is an example illustration of a spin filter embodiment.
FIG. 6 is an example illustration of multiple coarse spin filters that are housed in a container.

As shown in FIG. 5, the wall 56 comprises a material that allows fluid flow while filtering contaminates above a chosen size, as discussed below. The walls are attached to at least one buoyancy device 200 to maintain neutral or negative buoyancy and allows the operator to keep the inlet device at favorable depth. The buoyancy device 200 may comprise voids or compartments that may be selectively filled with air or water to provide varying degrees of buoyancy to the platform. Weights 60, similar to weights on a fishing net, can be attached to the inlet device 36 to control buoyancy and keep the wall 56 taunt, if they are flexible. In one example, the buoyancy device can add or bleed air to adjust density similar to submarine ballast system. At least one pipe or tubular 38 and preferably a plurality of pipes and tubulars with openings 57 are placed inside the walls 56 and allows pumps (not shown) to bring the water above the waterline to the offshore structure (not shown). In one embodiment, additional ocean water can be stored inside the substructure truss for periods of time when the inlet device and/or pumps need maintenance such as repairs or cleaning. This allows the plant to continue to run if major problems develop with the inlet or inlet pumps as the ocean water stored inside the barge would require only minor pumping and/or pressure suction. Alternatively, a plurality of inlet systems can be deployed to permit continuous running of the desalination system if one or more inlet devices fail.

As shown in FIG. 3, tension cables 59 or mooring lines can connect or brace the barge substructure tress 31 to the walls 56 or other parts of the inlet system. In addition, the walls 56 or other part of the inlet system can be anchored or moored to the ocean floor with anchor lines 58*b*, as shown in FIG. 4

In one embodiment, the inlet system depth is adjustable to obtain favorable water input conditions. The conditions include, but are not limited to, water temperature, salinity, turbidity, water bacteria, sediment containment and combinations thereof. In the embodiment shown in FIG. 4, the depth is controlled by a moveable arm hoist 39*b* that moves inside track 39*a* to obtain favorable depth positioning of the inlet device 36.

Filtration Device and System

The filtration devices and/or system can utilize known filters and pumps in a specific orientation to achieve favorable operating conditions. For example, U.S. Patent application No. 2011/0120928 disclosed the benefit of combining known different types of pre filtering devices before running water through the reverse osmosis membranes. U.S. Patent No. 2011/0120928 is hereby incorporated by reference.

In one embodiment, the filters should operate in at least two stages. The first stage comprises the rough or coarse filters which should filter solid contaminates with openings at least 2 millimeters in length and up to 10 millimeters in length depending on the depth, amount of marine life, ocean temperature and operational conditions and other requirements. In the example shown in FIG. 3, the rough filter is a standard fine netting typically used in fish farms supported by plastic pillars 58 on the outside. Another option (not shown) is to use wire mesh over a heavy metal frame supported by structural supports which can also serve as buoyancy devices below the metal frames.

The wire mesh filters can also be created through interwoven wires similar to a chain link fence or with screening created through punched plates. For example, type 304 stainless steel could be punched or woven into the desired sized screen filters. In one embodiment, exterior and/or interior scrubbers can clean the mesh filter of debris. In addition, the mesh should be coated with a polymer, or other coating, to prevent and/or reduce marine life attachment and sediment attachment. This coating can be 3-D printed to obtain a thin molecular coating to save costs. In addition, the first stage could have dual filters to filter to at least 4 millimeters. In this embodiment, the outer wall could filter with openings up to 10 millimeters and a second finer but still coarse mesh filter would be attached to the openings 57 of the end of the tubulars 38. In one embodiment, the outer wall would filter with openings at least 6 millimeters and no more than 10 millimeters with the opening filter designed to filter sediments with openings at least 2 millimeters and no more than 4 millimeters. The filters at the opening can be made of the same material as the wall or utilize well screens used in the oil and gas industry by engineering the screens to cover the opening 57. Scrubbers could be attached to the filters on the opening or alternatively, divers or remotely operated vehicles (ROVs) could be employed to clean the filters on the openings and/or the filters on the walls. Another option is to raise the inlet device above the waterline and clean with surface devices such as, high powered water cannons.

Pumps would create the force and suction necessary to bring the water through the opening up the pipe to the barge and/or structure. Once the pumps bring the rough filtered water to the structure, the next stage of filtering occurs.

A second stage can be used that would filter the sediments in the water of a size of at least 40 microns and up to 200 microns. In one embodiment, high throughput spin or centrifugal filters would be used to efficiently filter large volumes of water. These filters comprise: an inlet, a plurality of disk filters or helical scrolls that spin, and at least two outlets. One outlet is for the filtered water and a second outlet or drain is for the backwashed water that would remove the filtered sediments and marine life back into the ocean by feeding the discharge or backwash directly into the ocean or into a discharge system, as described later.

FIG. 5 is an example of a spin filter 61 and it is understood that other suitable filters can be used or modified to be used in this example with the benefit of the disclosure herein. In the example shown in FIG. 5, feed or contaminated water 62 is flowed through the inlet 63 into a hollow stack disk device 65 inside the filter walls 64. The spinning causing compression of the micron-grooved disks forcing water to flow between the grooves and traps of the stacked disks. Filtered water that exits the disks is flowed through outlet 66 wherein sediment particles fall due to gravity differences and can be flowed or backwashed through outlet 67. Alternatively, centrifugal filters can be used as is known in the art. These filters work by flowing water into the filters where discs or bowls cause the water to swirl around the inside of a cylinder. The centrifugal force causes the sand particles to move towards the outer edge of the bottle, which slide slowly down the side of a reservoir below, while the water flow up through a separate outlet above. This discharge from the centrifugal filter or spin filter can then be desalinated or sent for further pretreatment.

For example, filters made by Amiad Water Systems LTD from Israel would be employed. In particular, the SpinKlin® Super Galaxy High Flow filter would clean up to 100 microns. These filters are made of polymeric material such as, polypropylene and are self-cleaning with automated backwashing and are designed for water treatment plans. A plurality of these filters can be controlled by a control system described further below, to create an efficient system to handle the inlet water to meet the demands of the desalination plant. These pumps could be placed in a parallel formation or can be stacked, as needed, either horizontally or vertically.

FIG. 6 is a side view of parallel stacked spin filter centrifuges 61 in a row inside a container 70 designed to house the spin filters 61. As shown in FIG. 6, the spin filter 61 are aligned vertically in a horizontal row inside the container 70. Depending upon the size of the spin filters and container, multiple rows, or floors inside the container or skid, can be used with a plurality of aligned spin filters 61 on each floor or alternatively in each skid (not shown). The spin filters are shown with inlet line 71 and solid waste discharge outlets 72 lines. An additional purified outlet line 73 flows the purified water to the next stage. Typically, the spin filters run in parallel wherein water is run through only one set of filters. However, valves can create redundancy by allowing water flow that has exited a poor or broken filter to be recycled though at least one additional spin filter. An overhead crane can insert, move or remove containers comprising a plurality of filters, as necessary. Additional power connections 74 can provide power to the spin motors or alternatively, internal batteries (not shown) can be used for redundancy. Specifically, quick connects and disconnects would be used to allow for emergency disconnects or quick connections and disconnects for the inlets, outlets and power connections for quick removal and/or maintenance. Alternatively, the spins filters could be mounted on skids stacked vertically as this configuration makes it easier to stack and remove sections for maintenance.

Redundancy would be built into the system by having valve loops or recirculation tubing. In the event a filter fails, the system could automatically recirculate the water flow not properly filtered back to a working filtration section using the valve loops and/or recirculation tubing. The redundancy can be built into the containers, outside the container or combinations thereof. The parallel arrangement along with the vertical and horizontal stacking allows the filter system to be used most efficiently by minimizing the length of piping and/or spacing it takes to get the water through the reverse osmosis plant. This reduction of piping also reduces the pumping load requirements resulting in less energy costs.

In another embodiment, gravity filters can be used to pre-filter sediments as a primary filter or as an additional filtration stage. Gravity filters are commonly used in applications where liquid-solids separation is required in a variety of different applications for pre-treat and/or finish water treatment. Gravity filters can incorporate various types of media. In addition, gravity filters allow for easy inspection during operation and typically have a smaller profile. Quartz sand, silica sand, anthracite coal, garnet, magnetite, greens, activated carbon and other materials may be used as filtration media in gravity filters. Silica sand and anthracite are the most commonly used types. Typically, an underdrain system removes the filtered water and a backwash system periodically cleans the gravity filter. The three main classifications of gravity filters are single-media, dual-media and multi-media gravity filters. Persons skilled in the art will recognize the benefits of using certain types or combinations of filtration media to obtain favorable properties.

Figure 7:
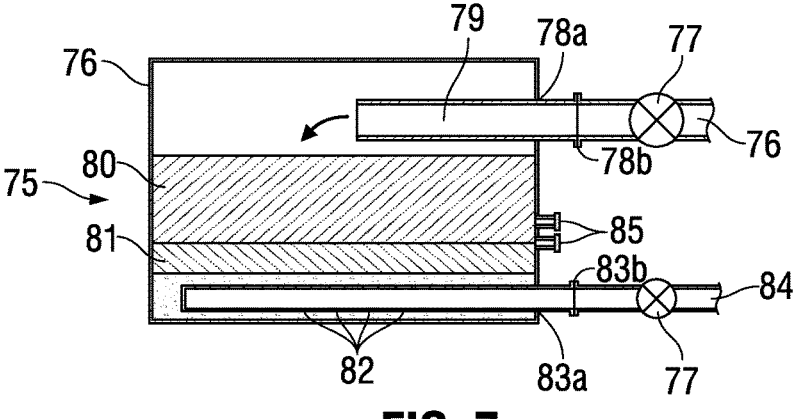
FIG. 7 is a cross-section of a side elevational view of a containerized media filter embodiment.

In one embodiment, a gravity filter is containerized to allow for quick insertion and removal of the gravity filters. FIG. 7 illustrates a gravity filter that has been modified for a container. As shown in FIG. 7, the gravity filter 75 has been engineered to fit inside a standard shipping container. Water is pumped though piping 76 past valve 77 into inlet 78a on the outside wall of the sipping container 76. Water enters the media filter onto wash trough 79 and then flows onto and through the filter media 80 which filters sediments in the water. In the example shown in FIG. 7 only one media is used but two or more media can be used, as needed. After the water percolates through the media 80 it then goes through gravel 81 into the underdrain pipes 82 leading to outlet 83a on the wall of container 76 through valve 77 into purified outlet line 84 to the next step of purification.

In this example, gravity is used to filter so no pumps are needed. However, pumps could be used to help the process or backwash as needed. Optional electrical connects 85 can be used to power sensors, pumps or other equipment as needed. Inlet 78a and outlet 83a have connection devices 78b and 83b connecting to piping 76 and outlet 84 respectively. These connections can be manual connections or quick connects, as described below. Persons skilled in the art with the benefit of the disclosure herein would recognize other types of media filters such as, pressure filters, which can be similarly designed to fit into a container, as illustrated in FIG. 7. In addition, multiple media filters run in series or parallel can be engineered to fit in a container, or alternatively, the plant can run each container in series or parallel to obtain favorable operating conditions.

In one embodiment, a final pre-filtration system called the micro-filtration or ultra-filtration unit. This filtration can utilize a variety of membrane filtration wherein forces including pressure or concentration gradients facilitate a separation through a semi-permeable membrane. Micro-filtration is a type of physical filtration process where a contaminated fluid is passed through a special pore-sized membrane to separate microorganisms and suspended particles from process liquid using pressure or gravity. Ultra-filtration is a pressure-driven purification process for removal of solids, turbidity and removal of proteins, endo-toxins and pathogens such as giardia, cryptosporidium, viruses and E. coli. Typically, ultrafiltration membranes have pore sizes ranging from 0.1 μm to 0.001 μm. Ultra-filtration filters are typically used in waste water treatment and pharmaceutical applications. This step should substantially remove all particles not dissolved in the water so that only essentially soluble impurities are left. For example, Evoqua Water Technologies, LLC from Warrendale, Pennsylvania manufactures several suitable micro-filtration and ultra-filtration devices. In particular, MEMCOR CP II™ filters are suitable for this application, as this provides module housing for a plurality of membranes requiring less footprint and with removable canisters for quick on-site repairs. This modular design can be containerized, as described herein.

Figure 8:
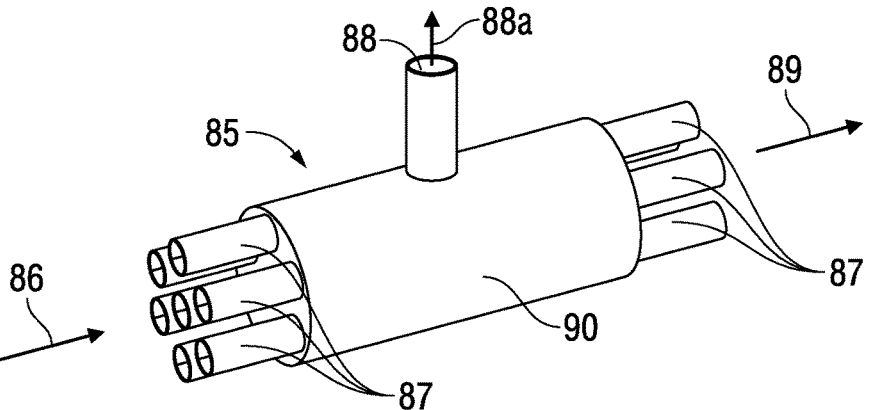
FIG. 8 is an example illustration of a microfiltration tube membrane embodiment.

FIG. 8 is a view of a tubular membrane filter 85 which can handle micro-filtration or ultrafiltration. The tubular membranes 87 in housing 90 can operate in tangential, or cross-flow, design where process fluid is pumped (shown by arrow 86) into filter 85 and along the membrane surface in a sweeping action. Water that is purified by flowing through the membranes flow through outlet 88, as shown by arrows 88a, whereas retained water with suspended solids and microorganism flow through the outlets of the membranes as shown by arrow 89. Ultrafiltration is preferred because reducing solid contaminates that enter the reverse membranes permits the reverse osmosis membranes to operate more efficiently and for longer periods of time without repairs and maintenance.

Figure 9:
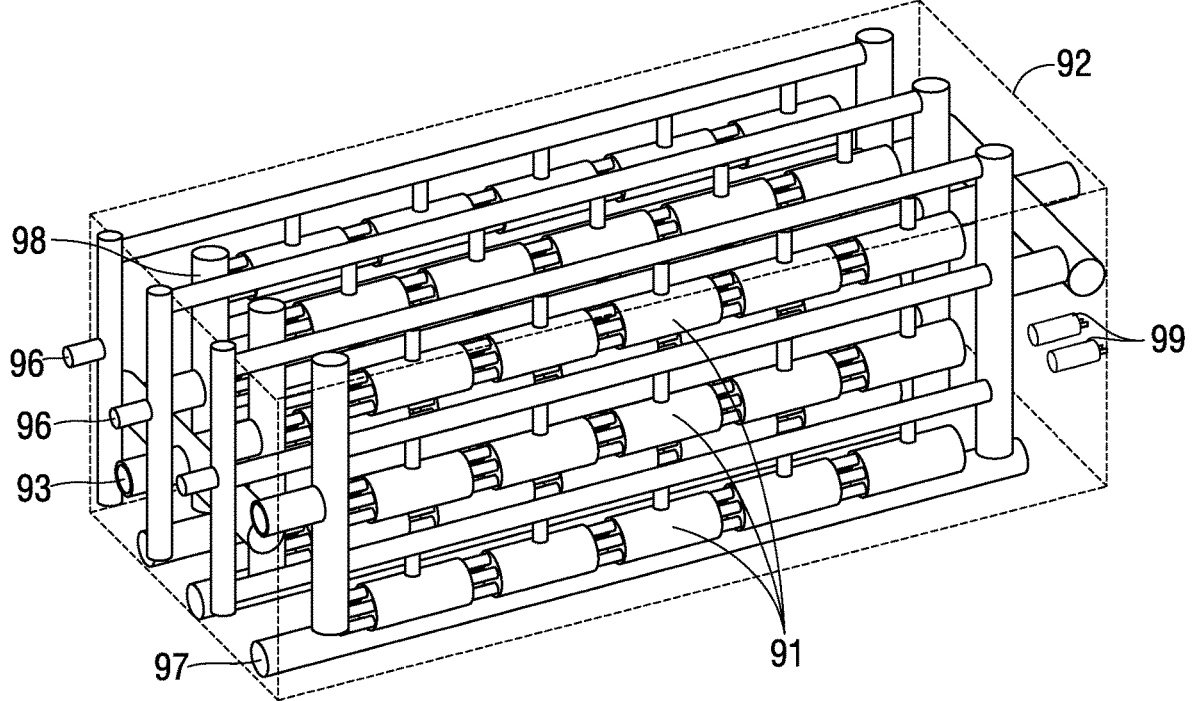
FIG. 9 is an example illustration of a containerized microfiltration tube membrane embodiment.

FIG. 9 illustrates a plurality of tubular membrane filters 91 engineered to fit inside a container 92. As shown in FIG. 9, water is flowed through inlet 93 on the container wall through the tubular membrane filters 91. Pumps (not shown) can be used to flow or force the water through the membrane filter inlet 93 through at least one membrane 91. The water flows through the membranes 91 into the membrane tubes 91 and then the filtered water flows through outlet 96 to the next process such as, reverse osmosis units. Wastewater is discharged through outlet 97 and can be discharged directly into the ocean or flowed through the discharge unit, as described below. In addition, air inlet 98 is engineered into the wall of the container 98 to provide compressed air (or gas), as needed, to flow the water through the membranes. Electrical connections 99 provide electrical power if needed to run the equipment inside including controls and sensors. As described above, all the connections can be designed for quick connects and disconnects to a plant system.

In one embodiment, the filters are placed adjacent to run in parallel train. In this embodiment, the different filters containers could be in separate sections or combined in an aligned train to make the process more efficient. For example, media and/or spin filters can be adjacent or aligned with the membrane filters. A common supply line can then be engineered to run alongside the filters or the container units. The example shown in FIG. 8, has the membranes oriented horizontally. However, the membranes can be position horizontally, vertically, slanted or in any combination thereof. The alignment would be chosen to maximize container space and also minimize the amount of piping and pumps needed to flow the water.

In one embodiment, each stage comprises a plurality of modular filters in each container, wherein any container that malfunctions or needs maintenance can be quickly removed by cranes or other equipment of the offshore structure. This embodiment enables any underperforming equipment, such as, filters to be quickly removed through disconnects adjacent to the containers. Alternatively, valves and recirculation tubing can reroute any water from a filter that has failed or needs maintenance. The valves can be controlled manually or be automated to allow real-time control, using a control system described below.

Other Pretreatment Options:

The primary objective of pretreatment is to make the feed water to the RO compatible with the membrane. Pretreatment is required to increase the efficiency and life expectancy of the membrane elements by minimizing fouling, scaling and degradation of the membrane. Fouling refers to entrapment of particulates, such as silt, clay, suspended solids, biological slime, algae, silica, iron flocs and other matter in the sea water. Most of the pretreatment options involves filtration. However, other pretreatment options include flocculator, lamella settler, dissolved air flotation systems, polymer preparation system, coagulant dosing station, water sterilization and other systems known to persons skilled in the art. Accordingly, persons skilled in the art could add additional pretreatment options to the pre-filtering steps described above using the disclosures and embodiments described herein to obtain favorable operating properties. The pretreatment options chosen would be based on the flowing variables including properties of the seawater, desired finished properties of the water, operating parameter and conditions of the desalination plant and combinations thereof.

Post Treatment System

Typically, the water produced from reverse osmosis needs to be treated to meet certain specification for industrial, municipal and agricultural usage. This process can be done onshore (to save space) or on the platform, as needed. Known post treatment equipment and processes can be used by persons skilled in the art to obtain favorable results using the embodiments describe herein. In addition, all post treatment processes can be engineered to fit inside a container to allow for the quick insertion and removal of post treatment equipment. Valves and piping can route or flow water through post treatment processes, as needed. In one embodiment, minerals would be added to water produced from the reverse osmosis systems to create a stabile PH balance for transporting. Preferably, a minimal amount of post treatment would be done on the offshore structure and the remaining post treatment would be done onshore.

Pipeline

Preferably

Preferably, a water pipeline would connect the offshore structure with the coastline. Depending on the depth, the pipeline can be suspended in the water through buoys to avoid the cost of laying a pipeline on the ocean floor. Carbon fiber material can be used to reduce the weight and corrosion issues typically found with steel pipelines.

Reverse Osmosis System

Typically, the final major process of water purification requires reverse osmosis filtration. Reverse osmosis (RO) is a water purification technology that uses a semipermeable membrane to remove larger particles from drinking water. In reverse osmosis, an applied pressure is used to overcome osmotic pressure, a colligative property, that is driven by chemical potential, a thermodynamic parameter. Reverse osmosis can remove many types of molecules and ions from solutions, including bacteria, and is commonly used in both industrial processes and the production of potable water. The result is that the solute is retained on the pressurized side of the membrane and the pure solvent is allowed to pass to the other side. Typically, to be "selective," the membrane allows large molecules or ions through the pores (holes) while allowing smaller components of the solution (such as the solvent) to pass freely.

Usually, the solvent naturally moves from an area of low solute concentration (high water potential), through a membrane, to an area of high solute concentration (low water potential). A pure solvent can be moveably driven to reduce the free energy of the system through equalizing solute concentrations on each side of a membrane, generating osmotic pressure. Applying an external pressure reverses, the natural flow of the pure solvent, thus, the term reverse osmosis. The RO process is similar to other membrane technology applications. However, key differences are found between reverse osmosis and filtration. The predominant removal mechanism in membrane filtration is straining, or size exclusion, whereas, the RO process can theoretically achieve perfect efficiency regardless of parameters such as the solution's pressure and concentration. RO also involves diffusion, making the process dependent on pressure, flow rate, and other conditions.

Figure 10:
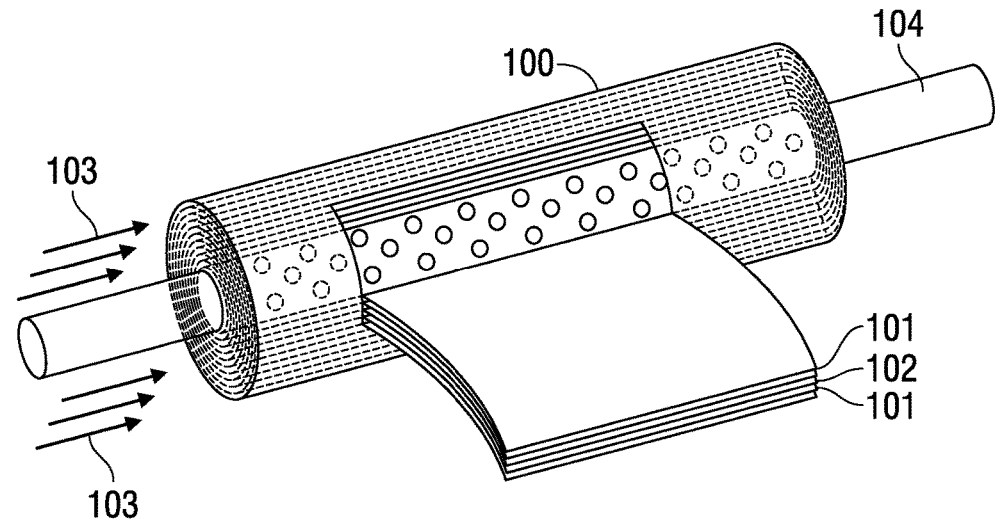
FIG. 10 is an example illustration of a tubular reverse osmosis embodiment.

FIG. 10 is an illustration of a typical reverse osmosis membrane used in the art. The membranes are inside an outer pressure tube 100 typically made of fiberglass to contain the membrane elements. Inside the pressure tube 100 is an impermeable sheet 101 that encases the membrane 102 on both sided of the membrane 102. The membrane 102 comprises a salt rejecting membrane material. Salt water is flowed (as shown by arrows 103) through the membranes which allows water molecules to pass through but not the salt water. The salt rejecting membrane material, in the Example shown in FIG. 102, can be a plasticized tricot with grooves in the tricot to create a spiral flow of desalinated water through a purified water exit tub 104 in the center. The reverse osmosis membrane shown in FIG. 10 is only an example reverse osmosis membrane, and other reverse osmosis membranes can be used with the benefit of the disclosures herein. Preferably, modular or sections or skids of reverse osmosis tubes would be employed to allow easy removal and maintenance of the RO filters.

Figure 11:
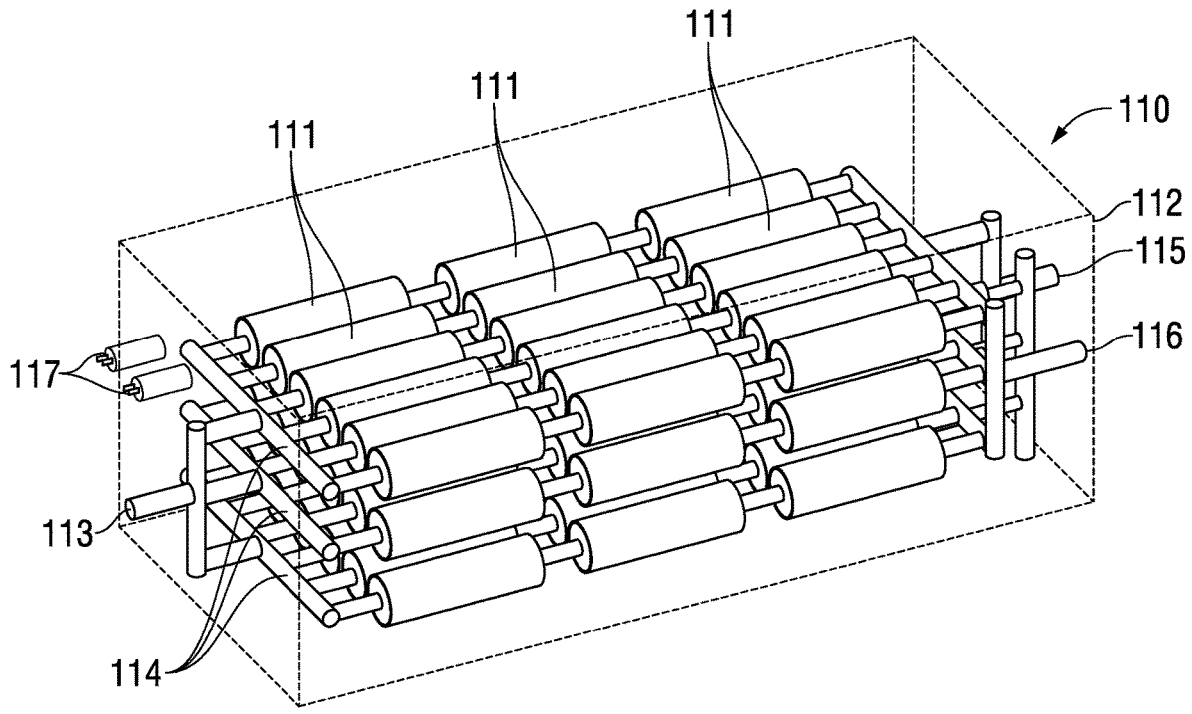
FIG. 11 is an example illustration of a containerized reverse osmosis membrane embodiment.

FIG. 11 illustrates a cross sectional side view of a containerized RO filter system 110 comprising plurality of tubular reverse osmosis membrane filters 111 engineered to fit inside a container 112. As shown in FIG. 11 water is flowed through inlet 113 on the container 112 wall through a plurality of piping 114 to the tubular membrane filters 111. Pumps (not shown) can be used to flow or force the water through the membrane filter inlet 113 to travel through at least one RO membrane filter 111. Water flows through the membranes 111 and then the filtered water flows through outlet 115 to the next stage such as, post treatment for transport as desalinated water. Wastewater is discharged through outlet 116 and can be discharged directly into the ocean or flowed through the discharge unit, as described below. One or more electrical connections 117 provide electrical power, if needed, to run the equipment inside including sensors and controls. As described above all the connections can be designed for quick connects and disconnects to a plant system.

IDE Technologies in Israel manufactures and sells a containerized reverse osmosis system which could be modified to work with the automated insertion and removal embodiments by engineering the connections and disconnects to match the plant frame. In particular, IDE Pro-green—Model SW-RO-M—provides RO modules engineered to fit inside a container. These RO modules could be engineered to have the quick connections and disconnects to work in the embodiments described herein.

Energy Recovery Devices:

Energy recovery devices ("ERD") can recapture energy expended by pumping or otherwise pressurizing water. This technology recovers energy from the pumping of water though industrial and municipal water distribution systems.

ERD for sea water reverse osmosis are often defined as devices that recover energy from the reject effluent such as, brine stream in sea water or brackish desalination facilities, and reintroduce this energy into the desalination process for reducing the overall energy consumption of the facility. The three main classes of ERD in use today in most of the SWRO facilities worldwide are often referred to as Class I, Class II or Class III devices.

Class I include the Francis Turbine and Pelton Wheel, designed as shaft assisting mechanisms, and feeding the recovered energy directly to the High Pressure Pump (HPP). The Pelton Wheel device has a maximum reported efficiency of 80-85%, and has been used for decades in use in SWRO plants.

Class II are referred to as hydraulic turbochargers (HTCs) or turbochargers further pressurize the seawater feed after it has passed the high pressure pump using rejected stream pressure. Turbochargers are used in some SWRO plants where low energy costs are not encouraging plant operators to install highly efficient energy recovery devices. With reported efficiencies of 80%, these devices compete with Class III devices in areas where energy costs are low due to their low overall costs including capital, operational, and maintenance costs.

Class III are devices that use the principle of positive displacement often referred to as isobaric pressure exchangers. The two main subclasses of devices in the third class are direct pressure feed and reciprocating pistons. Direct pressure feed uses the direct contact between brine and feed water to transfer energy. Reciprocating pistons transfers the brine pressure into mechanical action, which drives pistons to pressurize the feed.

Figure 12:
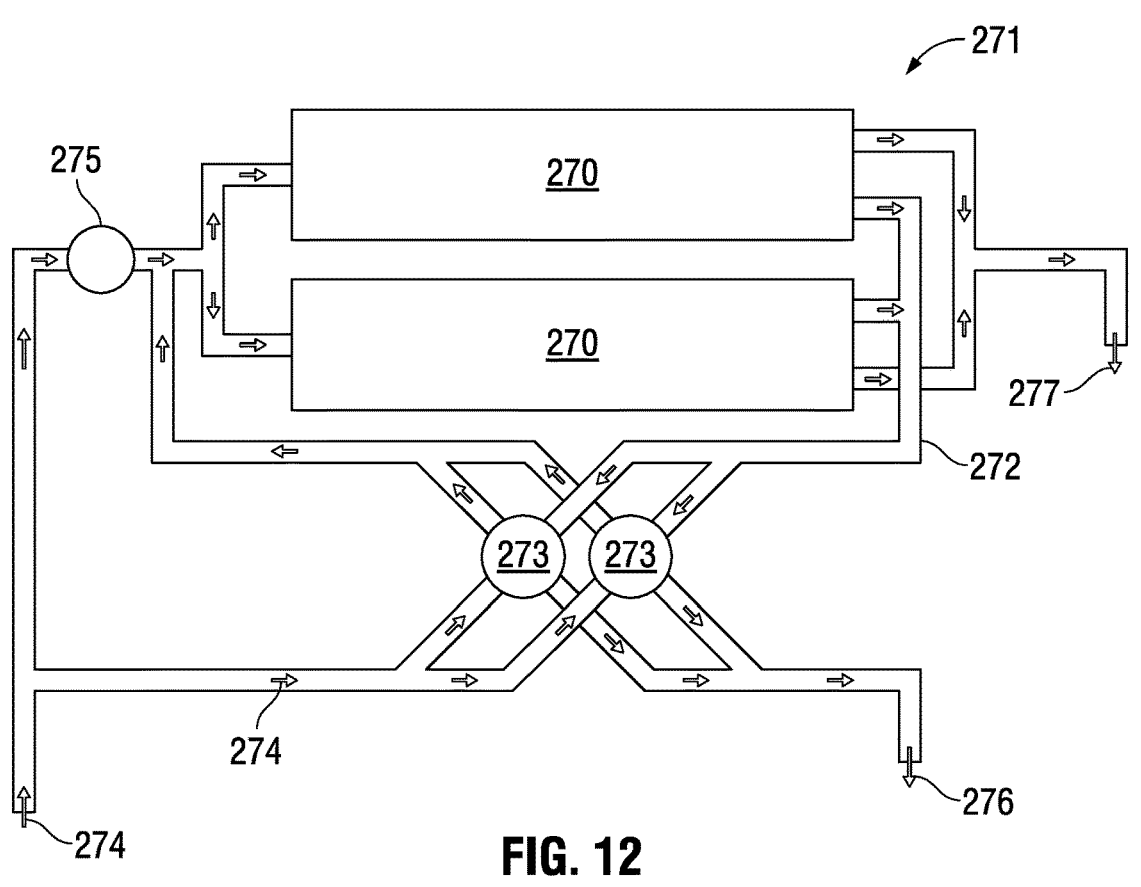
FIG. 12 is a schematic of a pressure recapture system connected to reverse osmosis membranes.

Most recently, dual work exchangers have achieved efficiency rates of up to 97 percent. As shown in FIG. 12, the work exchanger system 271 directs the high-pressure brine 272 exiting the RO membranes 270 to work exchanger vessels 273, filled with seawater, to pressurize the influent seawater or feed water 274. A small recirculating pump (not shown) on the work exchanger vessel 273 boosts the pressure of the seawater exiting the work exchanger vessel to equal the main feed pump 275 pressure and joins the flow to the RO membranes 270. The effluent brine 276 leaves through tubing for discharge or recycling, and the purified water leaves through tubing 277 for post treatment, or to the end users such as, consumers. For example, Flowserve markets a product called CALDER™ Dual Work Exchanger Energy Recovery (DWEER™) which have been successfully used in many plants and can be adapted to work in the embodiments described herein.

ERD can be engineered to be inside the reverse osmosis containers or can be designed to be in a stand-alone container where the feed water and pressurized water is piped into the containers. In this embodiment, the pressure exchanger tube would be inside a shipping container and each pressure exchanger would be connected to both the feed water line, the reject brine effluent line and the inlets and outlets of the reverse osmosis membranes. Furthermore, ERD can be engineered into the inlets and outlets systems to take advantage of head and pressure. In one embodiment, ERD could be used in the discharge system instead of paddles and hydroelectric systems, as described below.

Figure 13:
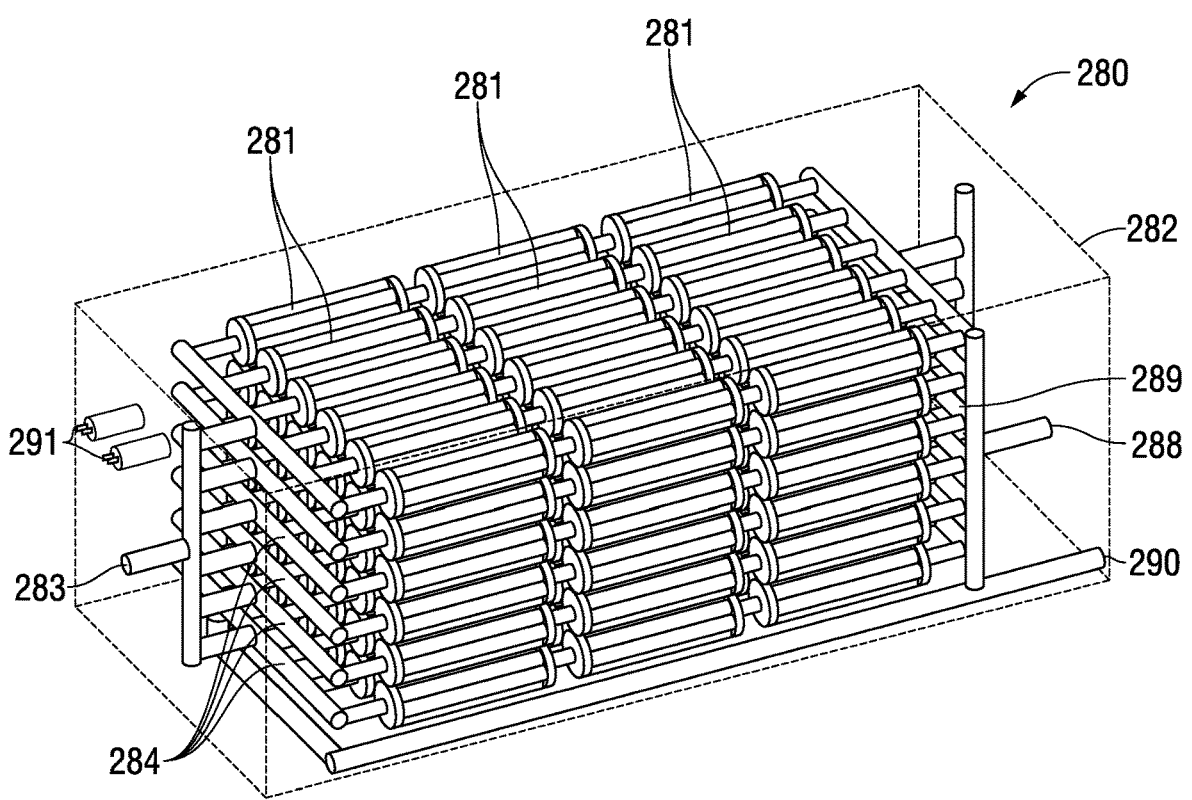
FIG. 13 is an example illustration of a containerized energy recovery device embodiment.
Figures 16, 17, 18:
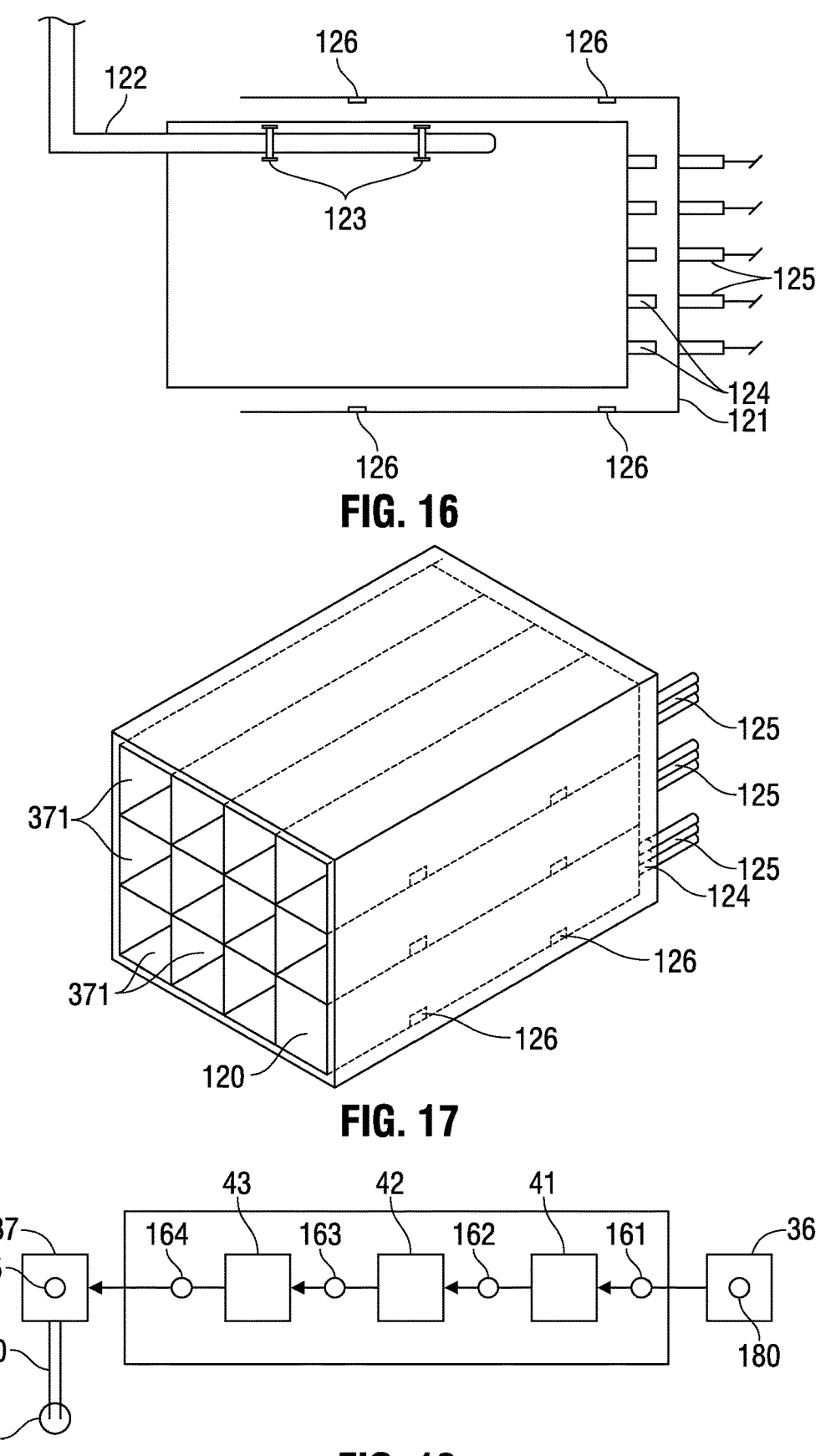
FIG. 16 is a side view illustrating a robotic arm loading a container into a housing section.
FIG. 17 is an illustration of a housing unit for holding multiple containerized equipment units.
FIG. 18 is a is a schematic showing a SCADA control system embodiment for operating a desalination plant.

FIG. 13 illustrates a cross sectional side view of a containerized pressure exchanger system 280 comprising a plurality of vessel tubes 281 with small recirculating pumps (not shown) engineered to fit inside a container 282. As shown in FIG. 16, feed water is flowed through inlet 283 on the container 282 wall through a plurality of piping 284 to the tubular membrane filters 281. Pressurized effluent from the RO membranes is flowed through inlet 285 through a plurality of piping to the pressure vessels. The small reciprocating pumps transfers the pressure form the effluent brine discharge to the feed water. The feed water is then exited through a plurality of feed water exit tubing to exit outlet 288. The effluent brine is flowed through a plurality if tubing 289 to exit outlet 290 for recycling or discharge. One or more electrical connections 291 provide electrical power, if needed, to run the equipment inside including sensors and controls. As described below all the connections can be designed for quick connects and disconnects to a plant system.

Discharge System:

A static discharge device or multi-component mixing device or combinations can be employed to mix the effluent discharge water with seawater. A static system would utilize physical equipment such as baffles or barriers to mix the water.

In one embodiment, multiple fluid injectors can be used to insert and mix seawater with the effluent discharge. Furthermore, the seawater discharge and mixing can be used to generate electricity to improve operational efficiency and reduce the carbon footprint. Another option is to create preferential fluid flow to create mixing in the discharge tubing. Such a device is disclosed in U.S. patent application Ser. No. 15/331,889 and published as U.S. Patent Publication No. 2017/0113194. U.S. Patent Publication No. 2017/0113194 is hereby incorporated by reference. In addition, such as device can be coupled with hydroelectric generators to create electricity and provide power to the plant and any excess power can be recycled into the power grid.

Figure 14:
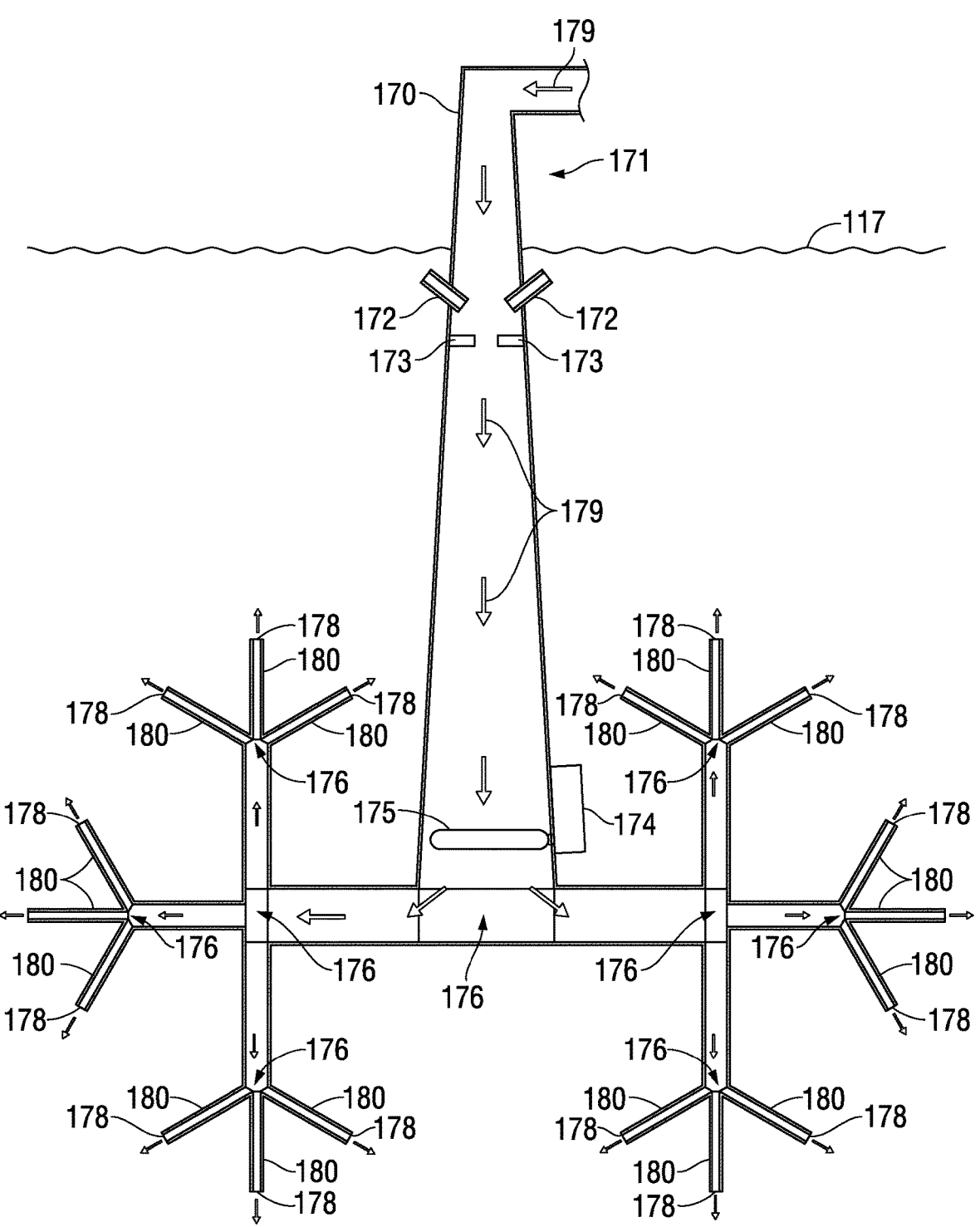
FIG. 14 is a side elevational view of a discharge device embodiment showing possible locations of inlets and mechanical diffusers.

FIG. 14 is an elevational schematic showing embodiments to mix discharge fluids with saltwater while generating electricity. As shown in FIG. 14, the discharge device 171 comprises a pipe 170 for flowing discharge fluids, as shown by arrow 179. The discharge pipe 170 is shown as a gradually expanding pipe diameter as depth below the sea surface 117 increases. The discharge pipe 170 is shown with two inlets 172, two baffles 173 and only one paddle 175 connected to the hydroelectric turbine generator 174. The inlets 172 are shown as mechanical funnels attached to the sidewalls of the discharge pipe 170. Additional or different inlets, paddles, baffles and generators and other equipment necessary to achieve favorable mixing and power cogeneration can be installed, as discussed above, or as known to persons skilled in the art, with the benefit of the disclosure herein.

As shown in FIG. 13, a plurality of devices 176 for sealing off sections of the pipe are installed. Suitable devices 176, for sealing off a section of pipe, include, but are not limited to, one-way valves, movable hatches, movable seals, selective flow membranes, or combinations thereof. In the embodiment shown, the opening and closing of the devices 176 are operable to seal, open or partially close fluid flow pathways to multiple alternative discharge section pipes 180 and thus, provide multiple, or alternative flow pathways. At least one discharge device (not shown), which can include, but is not limited to, one-way valves, seal, hatches at the outlet, membranes or combinations thereof, can prevent ocean water 114 from flowing into the discharge pipe 170. If any back-flow pressure starts to build, at least one of the plurality of devices 176, as discussed above, can close and seal off at least one alternative section of pipe 180 before the back-flow pressure causes pressure and/or fluid flow starts to flow in the direction opposite to flow arrow 171.

The system can then open at least one alternative section of pipe 180 to allow continuous flow of the discharge effluent. Once the at least one of the plurality of devices 176 closes, an alternative section of pipe 180, the outlet 178 and/or discharge device (not shown) can be fully opened to allow the discharge water in the sealed section of pipe to equalize with the ocean pressure. Alternatively, ports (not shown) on the sidewall of the closed section of pipe can open to allow equalization and then the ports and/or outlets 180 can close once the water pressure is equalized, as needed. Pumps (not shown) can then pump the discharge fluid out and draw in air, either from the surface or from a section of the discharge pipe with little or no fluid. Alternatively, a compressed gas system (not shown) can be installed along one, or more, of the alternative flow path section of the pipe.

A Pipe-in-pipe embodiment could be utilized with the outlet system. Pipe in pipe have been used in the oil and gas industry to transport different types of fluid and gasses in one line. Typically, at least one interior pipe is paced inside a larger exterior pipe creating at least two separate flow paths. In this design, the interior pipe would handle the effluent brine and the space between the exterior of the inner pipe and the exterior pipe would be for salt water that is injected into the inner pipe for mixing. Therefore, both the exterior pipe and the interior pipe would have ports. The exterior pipe would allow the free flow of sea water and the interior ports would inject the seawater into the interior pipes to facilitate advantageous mixing, as described above.
Containerization:

Another issue with offshore applications is the cost and difficulty of placing operating crews offshore. Offshore crews need to be highly trained and compensated as they spend long periods of time offshore. In addition, the supply costs for essentials such as, food water and other necessities adds to the costs. Automation has reduced the personnel needed in these offshore platforms. Such automation includes the SCADA systems described herein.

Recent technological advantageous have allowed almost all of the reverse osmosis equipment to be modular and scalable. This includes the pumps, power circuits and relays, pre-filtering equipment and post treatment, as well as the reverse osmosis membranes.

In one embodiment, container housing pump would be directly adjacent to the container housing the reverse osmosis tubes which would be directly adjacent to the pressure recapture systems or ERD. This aligned arrangement allows for containers to be quickly removed and replaced when necessary and to allow valves to bypass one container, or sections of aligned containers, to avoid equipment that is not working or equipment that is performing poorly. Internal lifts, robotic arms or overhead cranes would insert and remove the containers as necessary.

Typically, the pumps would be variable speed motors and controls to allow multiple speeds based on operational conditions for efficiency. The pump containers and reverse osmosis containers can be manufactured to be a standard 12×12×24 ISO skids. This will allow for over 25 16-inch reverse osmosis tubes and enough pumps and electrical controls in a separate container to operate one or preferably a plurality of reverse membrane containers.

Alternatively, smaller skids of 8×8×20 could be used to allow for easier transportation.

In one embodiment, the skids can be bolted steel and not galvanized steel to take additional stress. This would allow multiple stacking of skids to maximize space and limit piping to the skids. The small overhead crane can be a monorail crane for manual or electric chain hoist options to move equipment or containers. In one embodiment, the crane, pumps, electrical motor starters, or combinations thereof are operated by the control panel. This automation allows complete control without humans in the containers or skids.

Figure 15:
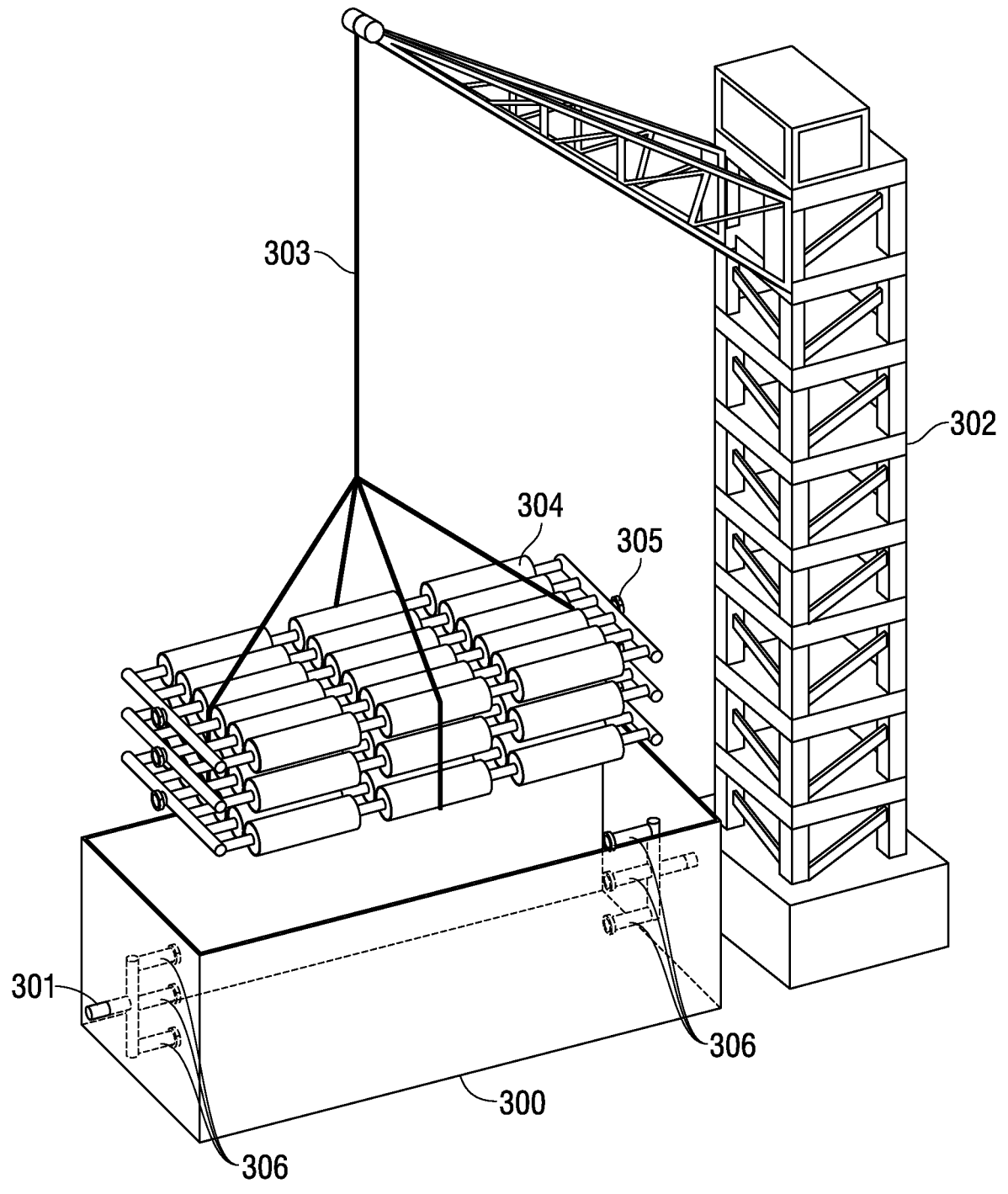
FIG. 15 is an example illustration showing the installation of water purification equipment into a container.

FIG. 15 illustrates a method embodiment to install equipment into the containers. In one embodiment, the containers 300 have the hookups 301 attached to the exterior of the wall which connect to interior piping or connectors 306. A crane 302 has a cable 303 to hold and support equipment 304 that is being installed into container 3000. The connector 305 on equipment 304 can be matched with connecter 306 on the inside of container 300. The connections can be automatic or can be welded or fastened, as needed.

FIG. 16 illustrates an example of robotic or automated containerized equipment being inserted into a housing. As shown in FIG. 16, a container is being loaded into a housing unit designed to store and operate the equipment in the container. The container 120 in this example is being loaded into the housing 121 with a robotic arm 122 that can be controlled by a remote control system (not shown).

The robotic arm can connect or latch onto the shipping container through one or more handles 123 or latches that can be designed or welded onto to the container 120. Alternatively, container 120 can be loaded with hoists or cranes with equipment that latches onto the frame of the containers or other means known to persons skilled in the art. A plurality of male connectors 124 is designed to match and mate onto corresponding female connectors 125. These connections can be controlled by mechanical hydraulic and electric systems run both manually and automated through a control system. Additional connections could be made by other means known by persons skilled in the art which include but are not limited to valve and suction device connectors. One or more moveable clamps or internal vices 126 can be used to clamp and hold the container securely, as needed. Alternatively, manual guides can be used to guide and mate male connectors 124 with female connectors 125. The process can be reversed to allow for quick and automated removal of equipment in a container.

FIG. 17 illustrates housing unit 370 for housing multiple containers 120. The housing shows 3 rows and 4 columns to create 12 container openings. Container 120 from FIG. 16 can be inserted into each opening 371 or section for each container. The male connecters 124 are inserted into female connecters 125. The robotic arms 122 from FIG. 16 can be used to insert each container 120 into the appropriate section openings 371. As shown in FIG. 17, the bottom right opening, has a container inserted into it. Guides 126 are utilized to help mate the male connectors 124 with the female connectors 125.

The advantage of containerization includes: plug and play unit, quick installation, limited design work, smaller foot print, mobile, easy transportation, turnkey delivery including piping, cables, controls and air conditioning, if necessary. However, the individual components can be all made to be containerized to allow an entire plant, or substantially the entire plant, or at least the majority of the plant to be containerized. The piping and valves of the plant can be designed to allow for any container to be bypassed if a container needs repair or maintenance of a container equipment, and if the resulting processes are not needed to favorably treat the water. The flow of the water can be controlled by the control system using sensors, valves, pumps and flow diverters as described below.

In one embodiment the ship or offshore plant will need to be modified to provide proper container infrastructure including container housing or foundations, interconnected piping and electrical supplies. In one embodiment, the containerization of a water treatment plant does not only include the supply of a container, it includes the complete installation of the plant. This can be accomplished by having each container provide all the necessary components. The container can provide connected piping between equipment pumps, vessels, skids, tanks along with cabling and wiring connecting pumps and instrumentation inside the container to main control cabinet. However, increased efficiency and improved economy of scale can be obtained by having each container represent a specific stage or process in the salt water desalination process. The containers can then be run in parallel, series or in combinations, with crossover controlled by the SCADA system.

Most containers are 20 or 40 foot containers. In one embodiment, the containerization includes all piping and fittings connecting all cables and wires connected to instrument and control cabinet. This is a "plug and play" unit supply.

The container can have at least one removable wall or wall section, one inlet/outlet (terminal point), and floor drainage and can be air cooled if needed. Each plant can be fully 3D-designed prior to construction to optimize space and placement of the containers. In this embodiment, the entire plant is modular and scalable and takes advantage of the design once build many programs. In addition, advances in technology can be seamlessly inserted into the plant or process during routine maintenance and upgrades through supply ships.

Reverse Osmosis units often required pre-treatment for the following parameters: suspended solids, TOC, COD/BOD, hydrocarbons, iron and manganese, and hardness. In one embodiment, one container provides all the pre-treatment and process requirements. Alternatively, each container can house a specific pre-treatment option and the control system can route the water to the various pre-treatment options to obtain favorable properties.

In another embodiment, a set of containers houses the reverse osmosis membranes and additional set(s) of containers houses the pumps and electrical circuitry to run the pumps and energy recapture equipment. The pump and electoral containers can then be strategically placed to provide the most efficient pumping system for the plant based on the design and performance specification of the plant. RO and/or pressure recapture systems likewise can be placed inside the pump containers or can be placed in separate containers as needed. Pump skids can combine the pumping equipment into one central unit that is pre-wired, pre-piped and easy to install. These pumps skids can be engineered to fit inside a container, using the disclosures involving containerization and/or housing embodiments described above.

In another embodiment, the location of the power, input fluid lines, and first and second effluent lines are prearranged in a specific embodiment. The housing is adapted to automatically connect with quick disconnects to power lines, and to piping lines in the plant with the container housing containing all the aligned corresponding and matching connections.

Advances of robotic technology have allowed for quick and automatic pallet systems for moving and installing containers in an organized and efficient manner. These systems provide quick installation and removal of any container, as needed. If a container breaks, the SCADA system can route the water being purified to a container that his working and also the automated system would quickly remove the malfunctioning container and replace it with a working container in storage. During resupply, the supply ships would bring replacement containers for broken containers or containers needing service and then send the removed containers to be serviced or repaired onshore. This would further reduce crews as very little maintenance would be done offshore. In addition, the automated container system would maximize space and would not require large works areas for maintenance crews to operate thus, saving space on the offshore ship or platform. For quick maintenance sections of the container wall or the entire container wall can be removed for maintenance purposes. For example, fasteners of bolts can hold a wall or a wall section securely yet allow for the easy removal for maintenance and repairs.

Ship Embodiment

While the embodiments have been mostly described using a SPAR platform, the embodiments could be modified to be used on any ship to allow for easy installation and removal of the plant to any locations. The ship containing the desalination plant in containers could be anchored or moored to a designated location, and support ships can be used to install the inlet and outlet device embodiments to the ship, once moored.

Offshore Oil and Gas Embodiments

In the past, oil and gas used salt-water to flood and pressurize reservoirs. Salt water has caused numerous problems with the underground reservoir. Problems includes increased microbes and scaling that lowers reservoir permeability. Solutions to salt water flooding include using freshwater and chemical treatments. Freshwater is not readily available and chemical treatments are expensive and have environmental issues.

One embodiment, would be to use part of the produced water for offshore water production by piping the water to the injection wells. This can be accomplished by using existing subsea pipelines and risers as well as laying new pipelines or risers to the injection wells. Also when salt water flooding is not an issue, salt-water effluent can be piped into the injection wells or non-producing wells. This can occur when a reservoir section is completely depleted or when several injection wells are used.

In this embodiment, the inner wells closest to the reservoir can use fresh water and the exterior wells further away from the producing reservoir can use salt-water or effluent brine. This embodiment would keep fresh water between the producing reservoir and the salt water that is being injected to help pressurize the wellbore without causing adverse salt water issues in the producing reservoir. Accordingly, a desalination platform could be placed advantageously near offshore oil and gas activity and the desalination platform could help provide the fresh water needs of the personal and onboard equipment. In addition, the desalination plant can also provide the fresh-water and salt-water flooding requirements of the subsea wells. The supply ships can be used to supply both the oil and gas platforms as well as desalination to reduce supply costs. In addition, electrical lines run to the platforms could be shared or used as backups to further improve efficiency and provide redundancy.

Carbon Fiber Tubing:

Composite materials such as, carbon fiber can be used to lower the cost and make the effluent piping more affordable and easier to modify with inlets. The composite consists of two parts: a matrix and a reinforcement. The reinforcement is carbon fiber, which provides the strength. The matrix is usually a polymer resin, such as epoxy, to bind the reinforcements together. The material properties depend on these two elements. Recent advantages in manufacturing have reduced the costs to produce carbon fiber tubing and are advantageous for the offshore environment by providing high strength-to-weight and rigidity.

Liners, including carbon fiber liners, have been utilized to internally line old pipes resulting in a fully structural strengthening system. Inside an older pipe, the carbon fiber liner acts as a barrier that controls the level of strain experienced by the steel cylinder in the host pipe. The composite liner enables the steel cylinder to perform within its elastic range, to ensure the pipeline's long-term performance is maintained. Carbon fiber designs are based on strain compatibility between the liner and host pipe. By using liners such as, carbon fiber liners, older gas, oil and water pipelines could be recommissioned to handle both fresh water and effluent brine discharge.

Land Embodiment

The embodiments discussed above have mainly been described for offshore desalination plants. While offshore has numerous advantageous that are described above, there are certain regions that need reverse osmosis desalination that are not adjacent near coastlines to allow for offshore desalination. In these situations, most of the embodiments described herein can be used to create a favorable land based desalination plant.

For example, the containerization and robotic automation can quickly allow for any warehouse to be turned into a fully functioning desalination plants. The containers will allow for easy transportation and delivery by rail or truck service to any land based desalination plant. Standardized containers would allow one manufacturing plant to produce containers for both onshore and offshore desalination plants. This would permit a design once and build many economy of scale programs to reduce design and capital costs of the plants. Any malfunctioning equipment can be removed and easily replaced and sent to be repaired at a designated repair facility, thus reducing the number of personal needed, reducing operating costs.

The robotic container system would quickly install and remove the equipment inside a plant, reducing time and cost for any maintenance or repairs. The control system would further reduce plant personnel by allowing a single operator or a remote operator to control the entire plant using automated remote controls.

The inlet system can be a wellbore drilled into a brackish or saltwater aquifer. The initial filtrations could be existing well screens employed in traditional oil, gas and water well operations.

The discharge system could be modified to run into a discharge wellbore drilled into the subterranean earth, using the discharge system and embodiments to mix the discharge inside a wellbore. For example, the inlets could be designed to be on the wellhead directly above the wellbore to mix the discharge water as it enters the discharge wellbore.

Control System:

In one embodiment, a control system is provided with the apparatus and/or method to create a system for obtaining favorable operation and performance of the apparatus and method. Factors to be considered for favorable operation of the apparatus and system include, but are not limited to, energy costs, energy production and water needs, amount of brine discharge, concentration and physical properties of brine discharge, properties of sea water, design of the equipment, operational conditions of the equipment, pressure, density, temperature, other differences between the discharge brine and sea water and combinations thereof.

In one embodiment, the controls can be standard manual or even automated controls. However, the discharge system can achieve even greater efficiencies and improved performance by using more advanced control systems, which may include a signal capture and data acquisition ("SCADA") system. SCADA is also an acronym for supervisory control and data acquisition. Typically, SCADA is a computer system for gathering and analyzing real time data. SCADA systems are used to monitor and control a plant or equipment in industries such as telecommunications, water and waste control, energy, oil and gas refining and transportation. A SCADA system gathers information, through equipment, such as sensors or gauges, and transfers the information back to a central site. The central site can collect the information necessary for efficient analysis and control of the plant, which includes, but is not limited to, determining if operational changes are advantageous or necessary, and displaying the information in a logical and organized fashion. SCADA systems can be relatively simple, such as one that monitors environmental conditions of a small building, or complex, such as a system that monitors all the activity in a nuclear power plant or the activity of a municipal water system. In addition, recent improvements in computer power and software configurations enable entire systems to be operated in real time with, or without, human interaction. The real time capabilities allow the control system to make decisions based on multiple factors and operate the water purification system favorably with little or no operator interaction.

Persons skilled in the art, with the benefit of the disclosures herein, would recognize similar monitoring and/or control systems that can be operatively connected therewith the disclosed apparatus, and which may thus be used in conjunction with the overall operation of the system. The SCADA control system can utilize a computer with a display panel, keyboard, and wireless router or may include any manner of industrial control systems or other computer control systems that monitor and control operation of the system. In one embodiment, the SCADA system may be configured to provide monitoring and autonomous operation of the system.

The SCADA controlled system may be interfaced from any location on the apparatus, such as from an interface terminal. The interface terminal can include cellular or satellite communication equipment, a wired or wireless router, servers or traditional wired connections, or any combinations thereof. In the embodiment shown in schematic FIG. 18, sensor(s) and/or corresponding controls could be connected to the interface terminal (not shown).

In an embodiment, the SCADA system including a portion, or all of the interface equipment and controls can be on an operations section of the apparatus. Additionally, alternatively, or as a backup, the SCADA controlled system may be interfaced remotely, such as via an internet connection that is external to the apparatus. A usable internet interface may include a viewer or other comparable display device, whereby the viewer may display real-time system performance data. In other embodiments, the SCADA system may be able to transfer data to spreadsheet software, such as, Microsoft Excel. The data may be related to temperature, salinity, heat or cooling needs, excess energy or cogenerations from industrial processes, pressure, flow rate, discharge rates, and/or other similar operational characteristics of the system.

The operations of the system may utilize a number of indicators or sensors, such as optical cameras, infrared cameras, ultrasonic sensors, lasers, density, electrical resistivity, sight glasses, liquid floats, temperature gauges or thermocouples, pressure transducers, etc. In addition, the system may include various meters, recorders, and other monitoring devices, as would be apparent to one of ordinary skill in the art. Sensors (160, 161, 162, 163, 164 and 165) are shown in FIG. 18. These sensors, shown in FIG. 18, are for the following: initial intake 160 on the inlet device 36, the location 161 after the water has been pumped to the platform, the location 162 after the water has been treated by the spin filters 41, the location 163 after the water has been treated by the ultrafiltration membranes, the location after the water has been treated by the reverse osmosis membranes 43 and the location 165 as the water enters discharge system and the location 166 after the water exits the pipes 170 of the discharge system 37. The discharge system can have its own SCADA system, as disclosed in U.S. Patent Application No. 2017/0113194 that can be operated alone or in combination with this SCADA system. One or more additional sensor(s) can be placed inside the equipment, pipes, containers and inlets to determine quantity and/or quality of the water through the process (not shown) and other sections throughout the discharge pipes and alternative pipe sections would provide additional monitoring and control abilities.

These devices may be utilized to measure and record data, such as the quantity and/or properties of the discharge brine including salinity, amount of fluid flow, and type of fluid flow including turbidity and salinity directly before and after discharge. Additional sensor(s) could be placed on the turbines (not shown), ERD, and other equipment to determine the operational conditions of the filters and RO units, how efficiently the water is being filtered and desalinated and the mixing of the discharge and how much energy is produced from the turbines on the discharge device.

The SCADA control system may provide an operator or control system with real-time information regarding the performance of the apparatus. It should be understood that any components, sensors, etc. of the SCADA system may be interconnected with any other components or sub-components of the apparatus. As such, the SCADA system can enable on-site and/or remote control of the apparatus, and in an embodiment, the system can be configured to operate without human intervention, such as through automatic actuation of the system components responsive to certain measurements and/or conditions and/or use of passive emergency systems. In another embodiment, the system can operate in real-time wherein a plurality of factors or all relevant factors are instantaneously or nearly instantaneously determined and used to calculate the most favorable operations. This real-time operation allows all components to be operated in a coordinated manner based on information received and responded to in real time including instantaneously, or nearly instantaneously.

The system may be configured with devices to measure "HI" and/or "LOW" temperatures, density, salinity pressure, turbidity sensors, or flow rates. The use of such information may be useful as an indication of whether the fluid flow rate should to be increased or decreased or depth increased or decreased by controlling the depth of the inlet device 36 through the buoyancy device 200, as shown in FIG. 4. The system may also be coupled with heat, pressure, and liquid level safety shutdown devices, which may be accessible from remote locations, such as the industrial energy or external heat source (not shown) on the plant to achieve further efficiency. For example, U.S. patent application Ser. No. 14/724,803 discloses a device and system for using excess heat energy to purify water. U.S. patent application Ser. No. 14/724,803 is hereby incorporated by reference. Such a device can be used to further purify water, maximize heating and cooling requirements while improving the overall efficiency of the plant.

The SCADA system may include a number of subsystems, including manual or electronic interfaces, such as a human-machine interface (HMI). The HMI may be used to provide process data to an operator, and as such, the operator may be able to interact with, monitor, and control the apparatus. In addition, the SCADA system may include a master or supervisory computer system such as, a server or networked computer system, configured to gather and acquire system data, and to send and receive control instructions, independent of human interaction such as real time operations, as described below. A communication device or digital port or remote terminal ("RT") may also be operably connected with various sensors. In an embodiment, the RT may be used to convert sensor data to digital data, and then transmit the digital data to the computer system. As such, there may be a communication connection between the supervisory systems to the RT's. Programmable logic controllers ("PLC") may also be used to create a favorable control system. The RT and PLC would most likely, but would not necessarily, be located in the interface terminal data acquisition of the system, which may be initiated at the RT and/or PLC level, and may include, for example, gauges or meter readings such as, temperature, pressure, density, equipment status reports, etc., which may be communicated to the SCADA, as requested or required. The requested and/or acquired data may then be compiled and formatted in such a way that an operator using the HMI may be able to make command decisions to effectively run the apparatus and/or method at great efficiency and optimization. This compilation and formatting of data can be used to enable real time operations, as discussed below.

In an embodiment, all operations of the system may be monitored via control system or in a control room within the operations section. In an embodiment, the operations section may be mounted on the discharge pipes, ship or structure. Alternatively, or additionally, the system can be operable remotely and/or automatically.

Hypothetical Example:

A hypothetical reverse osmosis plant was created using the features of the various embodiments discussed previously. This example is described below is an Automated Modular Offshore Desalination System "AMODS" utilizing a SPAR offshore structure. In particular, this structure was engineered, designed and manufactured to be the safest, most automated and most efficient in the desalination industry providing versatility, reliability and minimal maintenance, even in extremely harsh marine environments. This example of a reverse osmosis offshore plant is only a hypothetical example and is not meant to be limiting in any manner.

In this hypothetical, a specific location offshore of California was chosen. The location for the offshore structure is approximately 38 miles offshore Northwest of San Diego. The location was chosen to be at least 13 miles offshore to not be visible to anyone on the coastline in a building less than 100 feet high because of the curvature of the earth. The location was also chosen to be away from any environmental estuaries which are typically within 10 miles of the shore but sometimes can extend further offshore. As explained above, the best operational efficiencies require 200 feet of water or more. The factors that influence favorable depths, include but are not limited to, water temperature differential, distance to shoreline, head, and marine life. Depending on the coastline, this depth is typically found 20 miles offshore but it may be closer or farther away to reach this depth. While increased depth would provide some advantageous, any further distance from the coastline would increase costs for running pipeline, power cables and supplies to the structure by ship or helicopter. Therefore, all these factors are considered when choosing a location.

Once a location is chosen, a desalination plant is designed and then fabricated. The basic design remains the same, but the size of the structure and the amount of desalination can be scaled up or scaled down based on the operational needs and budget. However, the cost of increasing the volume of water desalinated declines significantly above 50 million gallons a day. Accordingly, a 100 million gallons per day or more offshore plant provides the most economic benefit. The design discussed below, is engineered to be a design once, build many times plant to reduce costs over time. After the financing is obtained, the structure is fabricated at a shipyard.

In this example, the SPAR structure would be built by Technip. A similar design could be chosen as the Hoover Diana SPA used in the Gulf of Mexico. Using such a proven design would require approximately one year and possibly up to 18 months to build.

In this example, the spar consists of a cylindrical hull, buoyed with air-filled compartments in the upper portion of the hull and ballasted with seawater and fixed ballasts in the bottom compartments. The desalination plant, which can be located on the platform or below the platform is designed to handle 100 million gallons per day of desalinated sea water. A three-level deck will house pumps filtration, and RO units.

The spar is moored via anchor lines, which extend in a radial pattern from the hull. The mooring lines are taut, but will have some flexibility and form a catenary between the hull and ocean floor. Each mooring line consists of chain (in the top and bottom sections) and spiral-strand wire rope (in the middle section).

A water pipeline approximately 35 miles long will be constructed, from the SPAR to an onshore pumping station. Similarly, an electrical cable will connect the SPAR to the onshore electrical grid through a relay station.

The offshore structure can be expedited by building the structure at multiple locations and then assembling the structure offshore typically using a dock or quay. Likewise, the desalination plant can be built the same way. The pumps, pipping, filters, and reverse osmosis membranes can all be manufactured modularly in plants throughout the world and then assembled at a dock or quay using cranes at the dock or nearby ships to install the equipment onto the structure. Accordingly, all the equipment would be assembled using standard dock or quay systems and then the structure will just need to be towed onto a chosen location. Alternatively, the desalination plant could be assembled on the platform on the chosen offshore location using supply ships feeding the containers to automated cranes to insert the containers in the appropriate housings. The structure can be designed up to 250 million gallons per day by using the largest available SPARS such as, the Holstein SPAR.

The 100 million-gallon design used in this hypothetical example would typically require 5 trains with each train providing 20 million per day of desalinated water. The five trains can be easily diagnosed and each train could operate independently or, if necessary, interdependently using the control system described above. Accordingly, if one train needs maintenance, the plant would still be capable of producing 80 million gallons per day. All equipment for each train can be aligned. Accordingly, the initial outlets, to the pumps, to the filters, to the reverse osmosis membranes and to the discharge system would work together in-line for each train. The trains and the desalinated water output could be sold individually or combined or split fractionally to different end users such as, commercial users, industrial users and municipalities. Accordingly, an industrial user, with the rights to one or more trains, can scale up or down the desalination trains, as demand requires. However, with the water shortage in California, most likely any excess could be sold to other users. Therefore, the operators, would likely run the trains at the maximum sustainable output unless efficiency or energy resources demands override consumption needs.

Chart 1 below illustrate the rough design parameters and suitable equipment models for the inlets, pumps, stage 1, 2, and 3 filters, and reverse osmosis filters for each train. These deigns and equipment models are only an example and are not meant to be limiting in any manner.

CHART 1

| Device | Description |
| --- | --- |
| Inlet | Multiple tubing surrounded by 10 mm fixed fishing nets |
| Pre-filtration | 2 mm wellbore screens on the inlet openings |
| Pumps | Variable multistage ring section pumps in containers strategically placed throughout the plant. |

CHART 1-continued

| Device | Description |
|---|---|
| Pretreatment | Chemical dosing and a flocculation basin in containers. |
| Initial Filtration | Dual media gravity filtration in containers |
| Reverse Osmosis System | IDE PROGREEN ™ SW-RO-M. 40-foot container sections coupled with CALDER ™ Dual Work Exchanger Energy Recovery (DWEER ™) |
| Discharge | Tubing with multiple inlets, flow paths, hydroelectric generators, and multi-port diffusers |

After the final assembly, one or more tug boats or support ships can tow or guide the SPAR offshore structure with the desalination plant to the location. The tug or support ships used to move and install the structure would not require heavy lift with this design. The heaviest lift requirement would be to install the SPAR sections. A Saipem 7000 crane heavy life vessel, one of the biggest heavy lift vessels in the world, would provide the necessary lift capability.

The location chosen provides a depth of approximately 200 feet, this allows the inlet system to be set at depths of up to 200 feet. However, the inlets should be as close to the surface of the water as possible while avoiding entrainment from wave action. Generally, the warmer the water, the more favorable the reverse osmosis filters operate. One possibility is to use colder water with warmer water to create thermal difference desalination as well as to cool the industrial equipment such as, engine cooling. Therefore, the inlets should be above any thermocline and below any wave action. One option is to make the inlets depth variable by a buoyancy device wherein during low wave and no red algae plumes. The depth of the inlet(s) can be controlled by the control system including a SCADA system to achieve favorable properties of the intake water.

The inlets are close to the surface to obtain warmer water and the inlets can be moved lover when wave action is a concern or red algae is detected. Furthermore, limiting the depth of the inlets improves efficiencies by reducing pumping loads and costs. In one embodiment, the buoyancy devices can be used to selectively control the depth to obtain the most favorable efficiencies in water temperature and depth using the factor discussed above and the control system.

The depth also makes saline effluent discharge more environmentally friendly. While the discharge system should greatly reduce the salinity of the discharge the depth further reduces the environmental issues of the effluent. The discharge device should preferably reduce the salinity of the effluent discharge to minimize harm to marine life. In one embodiment, the discharge device reduces the salinity to 42 parts per trillion ("ppt") or less which provides for species survival of at least 90 percent in testing. Typically, ocean salinity is approximately 34 ppt but varies by region.

The invention claimed is:

1. A method comprising:
a. obtaining at least one reverse osmosis housing device for holding a plurality of reverse osmosis membranes on a skid, wherein the plurality of reverse osmosis membranes on a skid can be removed and inserted and attached to connections on the at least one reverse osmosis housing that align and correspond to connections on the plurality of reverse osmosis membranes on a skid, and wherein at least one connection of the connections on the plurality of reverse osmosis membranes on a skid is a fluid line connecting the plurality of reverse osmosis membranes on a skid with the at least one reverse osmosis housing device;
b. operating a control device for the at least one reverse osmosis housing device configured to hold a plurality of reverse osmosis membranes on a skid;
c. automatically inserting the plurality of reverse osmosis membranes on a skid into the at least one reverse osmosis housing device using an automated insertion device, wherein the membranes are connected to fluid and power connections that align and correspond to the housing device;
d. obtaining a plurality of energy recovery devices for recapturing pressure energy from water running through the plurality of reverse osmosis membranes on a skid and returning the pressure energy to move additional water through at least a portion of the plurality of reverse osmosis membranes on a skid;
e. using the control device to coordinate energy recovery from the plurality of energy recovery devices located on a skid
f. using energy from the plurality of energy recovery devices to move water through the plurality of reverse osmosis membranes on a skid; and
g. removing brine from the water being moved through the plurality of reverse osmosis membranes on a skid.

2. The method of claim 1, further comprising removing the plurality of reverse osmosis membranes on a skid from the at least one reverse osmosis housing device.

3. The method of claim 1, wherein the plurality of energy recovery devices is located on a skid and further comprising obtaining at least one energy recovery housing device for holding the plurality of energy recovery devices on a skid, wherein the plurality of energy recovery devices on a skid can be removed and inserted and attached to connections on the at least one reverse osmosis housing device that align and correspond to connections on the plurality of energy recovery devices on a skid, and wherein at least one connection on the at least one reverse osmosis housing device that align and correspond to connections on the plurality of energy recovery devices on a skid is a fluid line connecting the plurality of energy recovery devices on a skid with the at least one energy recovery housing.

4. The method of claim 2, wherein the plurality of reverse osmosis membranes on a skid is a container with automated equipment and further comprising using the automated insertion device for inserting and removing the container with automated equipment, and wherein the automated insertion device is operated by the control device.

5. The method of claim 1, further comprising:
a. using an inlet device for obtaining the water;
b. using at least one pump for moving the water from the inlet device to at least one reverse osmosis housing device; and
c. using at least one filter for removing particles in the water.

6. The method of claim 3, further comprising removing the plurality of energy recovery devices on a skid from the at least one energy recovery housing.

7. The method of claim 3, further comprising inserting the plurality of energy recovery devices on a skid from the at least one energy recovery housing.

8. The method of claim 3, wherein the plurality of energy recovery devices on a skid is a container with automated energy recovery equipment and further comprising using the automated energy recovery equipment for inserting and removing the container with automated equipment and operating the automated energy recovery equipment with the control device.

9. The method of claim 1, further comprising using automated connections and disconnects for the connections on the plurality of reverse osmosis membranes on a skid and the connections on the reverse osmosis housing device.

10. The method of claim 1, further comprising lowering an inlet device having a tubular section that is at least partially submerged into a body of water; and using a plurality of pumps located on a skid for moving the water through the tubular section on the inlet device to water purification equipment located on a plurality of skids.

11. A water purification method comprising:
a. obtaining a reverse osmosis housing device for holding a plurality of reverse osmosis membranes on a skid, wherein the plurality of reverse osmosis membranes on a skid can be removed and inserted and attached to connections on the reverse osmosis housing device that align and correspond to connections on the plurality of reverse osmosis membranes on a skid, and wherein at least one connection is a fluid line connecting the plurality of reverse osmosis membranes on a skid with the reverse osmosis housing device;
b. obtaining a plurality of energy recovery devices for recapturing pressure energy from water running through the plurality of reverse osmosis membranes on a skid and returning the pressure energy to move additional water through at least a portion of the plurality of reverse osmosis membranes on a skid;
c. automatically inserting the plurality of reverse osmosis membranes on a skid into the at least one reverse osmosis housing device using an automated insertion device, wherein the membranes are connected to fluid and power connections that align and correspond to the reverse osmosis housing device;
d. using the energy recovery from the plurality of energy recovery devices located on a skid to move water through the plurality of reverse osmosis membranes on a skid; and
e. removing brine from the water being moved through the plurality of reverse osmosis membranes on a skid; and
f. using a discharge device for discharging brine from the plurality of reverse osmosis membranes on a skid.

12. The method of claim 11 further comprising
a. using an inlet device for obtaining the water;
b. using at least one pump for moving the water from the inlet device to at least one reverse osmosis housing device; and
c. using at least one filter for removing particles in the water.

13. The method of claim 11, further comprising using automated connections and disconnects for the connections on the plurality of reverse osmosis membranes on a skid and the connections on the reverse osmosis housing device.

14. The method of claim 11, further comprising lowering an inlet device having a tubular section that is at least partially submerged into a body of water; and using a plurality of pumps located on a skid for moving the water through the tubular section on the inlet device to water purification equipment located on a plurality of skids.

15. A method comprising:
a. obtaining a system comprising; an inlet device; at least one pump for moving water from the inlet device to water purification equipment; at least one filter to remove particles in the water; at least one reverse osmosis housing device for holding a plurality of reverse osmosis membranes on a skid, wherein the plurality of reverse osmosis membranes on a skid can be removed and inserted and attached to connections on the at least one reverse osmosis housing device that align and correspond to connections on the plurality of reverse osmosis membranes on a skid, and wherein at least one connection is a fluid line connecting the plurality of reverse osmosis membranes on a skid with the at least one reverse osmosis housing device; a plurality of energy recovery devices located on a skid for recapturing pressure energy from water running through the plurality of reverse osmosis membranes and returning the pressure energy to move additional water through at least a portion of the plurality of reverse osmosis membranes, at least one energy recovery housing device for holding the plurality of energy recovery devices on a skid, wherein the plurality of energy recovery devices on a skid can be removed and inserted and attached to connections on the at least one energy recovery housing device that align and correspond to connections on the plurality of energy recovery devices on a skid, and wherein at least one connection on the at least one energy recovery housing device that align and correspond to connections on the plurality of energy recovery devices on a skid is a fluid line connecting the plurality of energy recovery devices on a skid with the at least one energy recovery housing device; a discharge device for discharging the brine from the plurality of reverse osmosis membranes; a plurality of sensors; and a control device that is connected to the plurality of sensors and can the plurality of reverse osmosis membranes and the plurality of energy recovery devices in a coordinated manner;
b. automatically inserting the plurality of reverse osmosis membranes on a skid into the at least one reverse osmosis housing device using an automated insertion device, wherein the membranes are connected to fluid and power connections that align and correspond to the reverse osmosis housing device;
c. using energy from the plurality of energy recovery devices located on a skid to move water through the plurality of reverse osmosis membranes on a skid; and
d. removing brine from the water being moved through the plurality of reverse osmosis membranes on a skid.

16. The method of claim 15, further comprising:
a. using the inlet device for obtaining the water;
b. using the at least one pump for moving water from the inlet device to water purification equipment; and
c. using the at least one filter to remove particles in the water.

17. The method of claim 15, further comprising removing the plurality of energy recovery devices on a skid from the at least one energy recovery housing device.

18. The method of claim 15, further comprising inserting the plurality of energy recovery devices on a skid from the at least one energy recovery housing device.

19. The method of claim 15, wherein the plurality of energy recovery devices on a skid is a container with automated energy recovery equipment and further comprising using the automated energy recovery equipment for inserting and removing the container with automated equipment and operating the automated energy recovery equipment with the control device.

20. The method of claim 15, further comprising using automated connections and disconnects for the connections on the plurality of reverse osmosis membranes on a skid and the connections on the reverse osmosis housing device.

* * * * *